United States Patent [19]
Heckerman et al.

[11] Patent Number: 5,715,374
[45] Date of Patent: Feb. 3, 1998

[54] METHOD AND SYSTEM FOR CASE-BASED REASONING UTILIZING A BELIEF NETWORK

[75] Inventors: David E. Heckerman, Bellevue; Gregory L. Shaw, Kirkland; John S. Breese, Mercer Island, all of Wash.

[73] Assignee: Microsoft Corporation, Redmond, Wash.

[21] Appl. No.: 267,798

[22] Filed: Jun. 29, 1994

[51] Int. Cl.⁶ ................................................ G06F 15/18
[52] U.S. Cl. .............................. 395/81; 395/75; 395/77
[58] Field of Search ........................... 395/51, 75, 20, 395/60, 77

[56] References Cited

U.S. PATENT DOCUMENTS 5,224,206  6/1993  Simoudis .................................. 395/77

OTHER PUBLICATIONS

Kozlov et al, "A parallel lauritzen–spiegelhalter algorithm for probabilistic inference"; Proceedings supercomputing '94, pp. 320–329, 14–18 Nov. 1994.
Wang et al, "Dynamic structuring of belief networks in a hierarchical perceptual organization"; ISSIPNN '94, pp. 519–522 vol. 2, 13–16 Apr. 1994.
Heckerman et al, "An approximate nonmyopic computation for value of information"; IEEE Transactions on pattern analysis and machine intelligence, vol. 15, iss. 3, pp. 292–298, Mar. 1993.
Bellazzi, Riccardo, Silvana Quaglini, and Carlo Berzuini. "GAMEES II: An Environment for Building Probabilistic Expert Systems Based on Arrays of Bayesian Belief Networks." Computer–Based Medical Sysems, 1992 Symposium.

Dutta, Soumitra. "Integrating Case Based and Rule Based Reasoning: The Possibilistic Connection." Uncertainty in Artificial Intelligence 6. pp. 281–298, 1991.

Kriegsman, Mark and Ralph Barletta. "Building a Case–Based Help Desk Application." IEEE Expert 8(6). pp. 18–26, Dec. 1993.

Keen, Mike. "Case Bases for Help Desks." IEE Colloquium on Case–Based Reasoning, 1993.

Burnell, Lisa J. and Scott E. Talbot. "Incorporating Probabilistic Reasoning in a Reactive Program Debugging System." IEEE Expert Magazine 9(1), Feb. 1994.

Shafer, Dan. "CBR Express: Getting Down to Cases." PCAI Magazine. Jul./Aug. 1991.

*Primary Examiner*—Tariq R. Hafiz
*Attorney, Agent, or Firm*—Seed and Berry LLP

[57] ABSTRACT

An improved method and system for performing case-based reasoning is provided. A belief network is utilized by the preferred case-based reasoning system for assisting a user in problem resolution. After resolving a problem of a user, the preferred embodiment of the present invention updates the probabilities in the belief network so as to provide for a more accurate problem resolution upon the next invocation of the preferred embodiment. The belief network of the preferred embodiment contains six data types relating to a problem resolution scenario. The data types utilized by the belief network of the preferred embodiment include: issues, causes, resolutions, symptoms, terms, and alternates.

28 Claims, 20 Drawing Sheets

METHOD AND SYSTEM FOR CASE-BASED REASONING UTILIZING A BELIEF NETWORK

TECHNICAL FIELD

The present invention relates generally to data processing systems and, more particularly, to case-based reasoning systems.

BACKGROUND OF THE INVENTION

The advent of artificial intelligence within computer science has brought an abundance of decision-support systems. A decision-support system is a computer system in which decisions, typically rendered by humans, are recommended and sometimes made by the computer system. In creating decision-support systems, computer scientists seek to provide decisions with as high a level of accuracy as possible. Thus, computer scientists strive to create decision-support systems that are equivalent to or more accurate than a human expert. Applications of decision-support systems include medical diagnosis, troubleshooting computer networks, customer service or other systems wherein a decision is based upon identifiable criteria.

One type of decision-support system employs case-based reasoning to assist in making decisions. Case-based reasoning is an approach to problem solving based on the retrieval and adaptation of cases. A case is a problem resolution scenario including the description of the problem to be resolved and one or more associated solutions to the problem. Conventional case-based reasoning ("CBR") systems utilize a five-step problem solving process. First, a user inputs a description of a problem (the "problem description") into the CBR system. The CBR system next accesses a database of cases which contains previously observed problem resolution scenarios and retrieves the closest matching cases to the problem as input by the user (the "current problem"). The CBR system then utilizes the current problem and the cases retrieved from the database to generate a solution to the current problem. After a solution is generated, the solution is applied to the current problem and feedback is gained from the user as to whether the solution fixed the current problem. Finally, if the solution solved the current problem, the solution is added to the case base for use in future problem solving.

One example of an application of a conventional CBR system is utilized by a customer service organization of a computer company. This conventional CBR system is utilized by the customer service organization of the company for handling phone calls from the customers of the company. The customer service CBR system contains hundreds of cases relating to problems associated with the use of products sold by the company. When customers call the customer service organization, customer service representatives access the customer service CBR system for help in diagnosing the problems of the customers. The customer service CBR system maintains a database and upon invocation, the CBR system retrieves similar cases from the database to the problem of the customer and presents the cases to the customer service representative. The customer service representative then utilizes the cases retrieved from the database to suggest solutions to the problem of the customer. Thus, the customer service representative must manually determine solutions to the problem of the user. In addition, the customer service CBR system suffers from the same limitations as those of conventional CBR systems. That is, conventional CBR systems must store hundreds of cases and conventional CBR systems utilize a heuristic method for problem solving. Since there is no facility for updating the heuristic method of conventional CBR systems, when conventional CBR systems produce an error (e.g., incorrect problem solving), the errors will continue without correction.

SUMMARY OF THE INVENTION

In accordance with a first aspect of the present invention, a case-based decision support system is provided. The case-based decision support system of the present invention contains a storage device further containing a belief network for storing knowledge obtained from observed cases and for suggesting solutions to problems encountered by a user and a memory. The memory of the case-based decision support system of the first aspect of the present invention further comprises an authoring component for receiving information from the user, for creating the belief network, and for storing the created belief network into the storage device. The memory of the case-based decision support system of the first aspect of the present invention further comprises a reasoning component for receiving input from the user, for accessing the belief network, and for generating a resolution to the problem encountered by the user.

In accordance with the second aspect of the present invention a method is executed in a computer system containing a belief network. In accordance with this method of the second aspect of the present invention, the preferred embodiment receives input from the user, generates a resolution to the encountered problem of the user, and adjusts the probabilities in the belief network in response to the generated resolution.

DETAILED DESCRIPTION OF THE INVENTION

The preferred embodiment of the present invention provides an improved system and method for creating case-based reasoning systems. The case-based reasoning system of the preferred embodiment utilizes a belief network to provide higher accuracy in resolving problems and for increasing the accuracy after each case is observed. The case-based reasoning system of the preferred embodiment provides a more accurate system for problem solving by utilizing the knowledge learned from previously observed cases instead of storing previously observed cases, thereby reducing storage requirements. The knowledge obtained from previously observed cases is stored in the belief network. After observing each case, the belief network utilized by the preferred embodiment is updated so as to reflect the observed cases. This updating modifies probabilities contained within the belief network to provide for more accurate problem solving upon the next invocation of the CBR system of the preferred embodiment. In addition, this updating can correct errors so that the errors do not continually occur.

Figure 1:
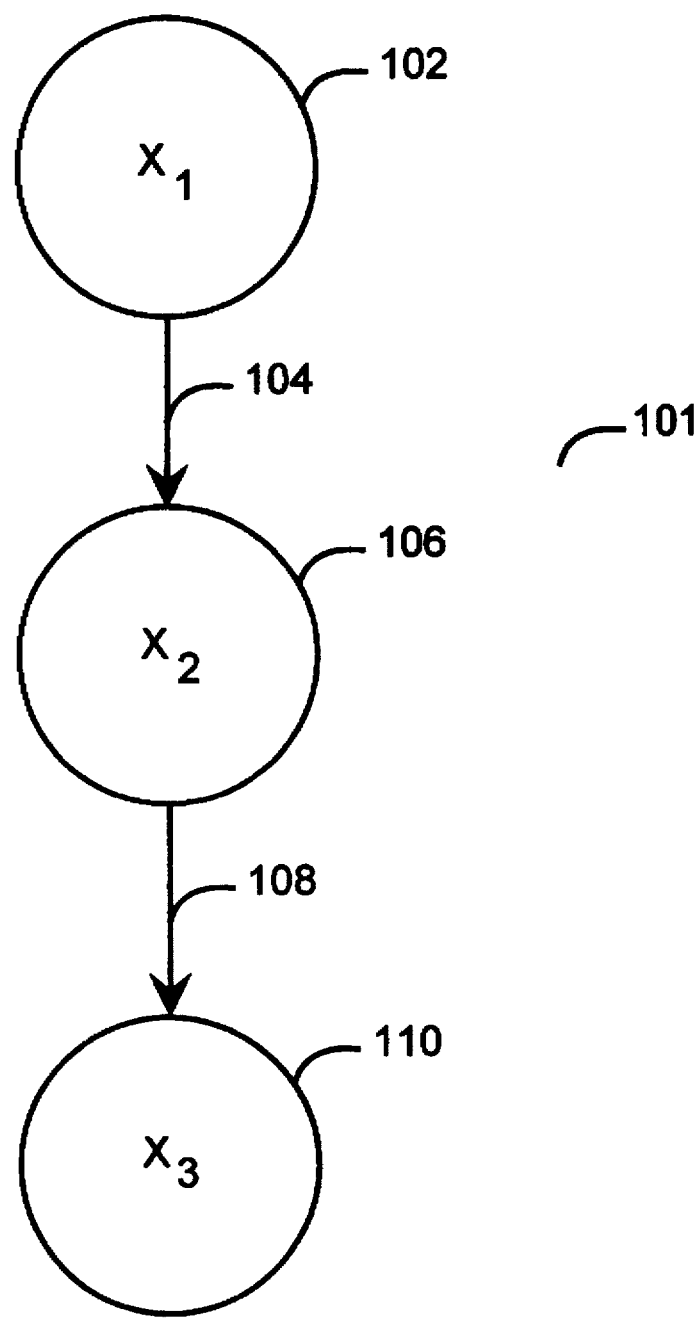
FIG. 1 depicts an example belief network.

A belief network is a representation of the probabilistic relationships among states of a portion of the world. The states of the world in a belief network can change and are, therefore, called variables. A belief network is expressed as an acyclic directed graph where the variables correspond to nodes and the relationships between the nodes correspond to arcs. FIG. 1 depicts an example belief network 101. In the depicted belief networks there are three variables, $X_1$, $X_2$, and $X_3$, which are represented by nodes 102, 106 and 110, respectively. The example belief network contains two arcs 104 and 108. Associated with each variable in a belief network is a set of probability distributions. Using conditional probability notation, the set of probability distributions for a variable can be denoted by $Pr(x_i|\Pi_i)$, where "Pr" refers to the probability distribution and "$\Pi_i$" denotes the parents of variable $X_i$. Thus, this expression reads as follows: the probability distribution for variable $X_i$ given the parents of $X_i$. For example, $X_1$ is the parent of $X_2$. The probability distributions specify the strength of the relationships between variables. For instance, if $X_1$ has two states (true and false), then associated with $X_1$ is a single probability distribution $Pr(x_1|\emptyset)$ and associated with $X_2$ are two probability distributions $Pr(x_2|x_1=t)$ and $Pr(x_2|x_1=f)$. Probability distributions can be of two types: prior and posterior. A prior probability distribution refers to the probability distribution before data is observed. A posterior probability distribution is the probability distribution after data is observed.

The arcs in a belief network convey dependence between nodes. When there is an arc between a first node and a second node, the probability distribution of the first node depends upon the value of the second node when the direction of the arc points from the second node to the first node. For example, node 106 depends upon node 102. Therefore, node 106 is said to be conditionally dependent. Missing arcs in a belief network convey conditional independence. For example, node 102 and node 110 are conditionally independent given node 106. However, two variables indirectly connected through intermediate variables are conditionally dependent given knowledge of the values ("states") of the intermediate variables. Therefore, if the value for $X_2$ is known, $X_1$ and $X_3$ are conditionally dependent.

In other words, sets of variables X and Y are said to be conditionally independent, given a set of variables Z, if the probability distribution for X given Z does not depend on Y. If Z is empty, however, X and Y are said to be "independent" as opposed to conditionally independent. If X and Y are not conditionally independent given Z, X and Y are said to be conditionally dependent.

The variables used for each node may be of different types. Specifically, variables may be of two types: discrete or continuous. A discrete variable has a countable number of states, either finite or infinite, whereas a continuous variable is a variable that has an uncountably infinite number of states. An example of a discrete variable is a Boolean variable. Such a variable can assume only one of two states: "true" or "false." An example of a continuous variable is a variable that may assume any real value between −1 and 1.

Figure 2:
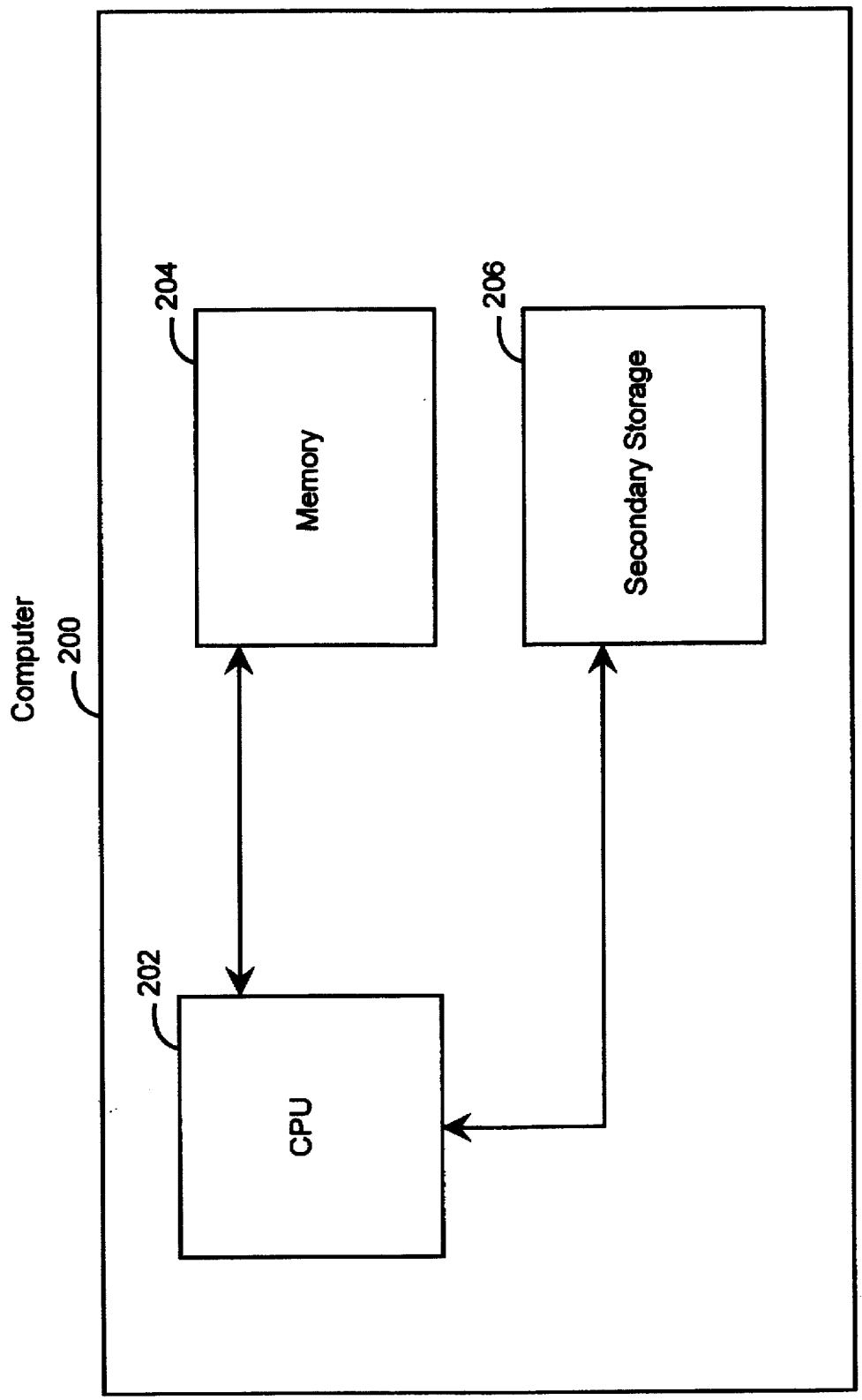
FIG. 2 depicts a computer system suitable for practicing a preferred embodiment of the present invention.

FIG. 2 depicts a computer system suitable for practicing a preferred embodiment of the present invention. The computer system 200 contains a central processing unit (CPU) 202, a memory 204, and a secondary storage device 206. The CPU 202 is responsible for accessing data and computer programs on the secondary storage device 206. In addition, the CPU 202 is responsible for transferring computer programs into the memory 204 and executing the computer programs once resident in the memory. One skilled in the art will appreciate that a computer suitable for practicing the preferred embodiment of the present invention can contain additional or different components.

Figure 3A:
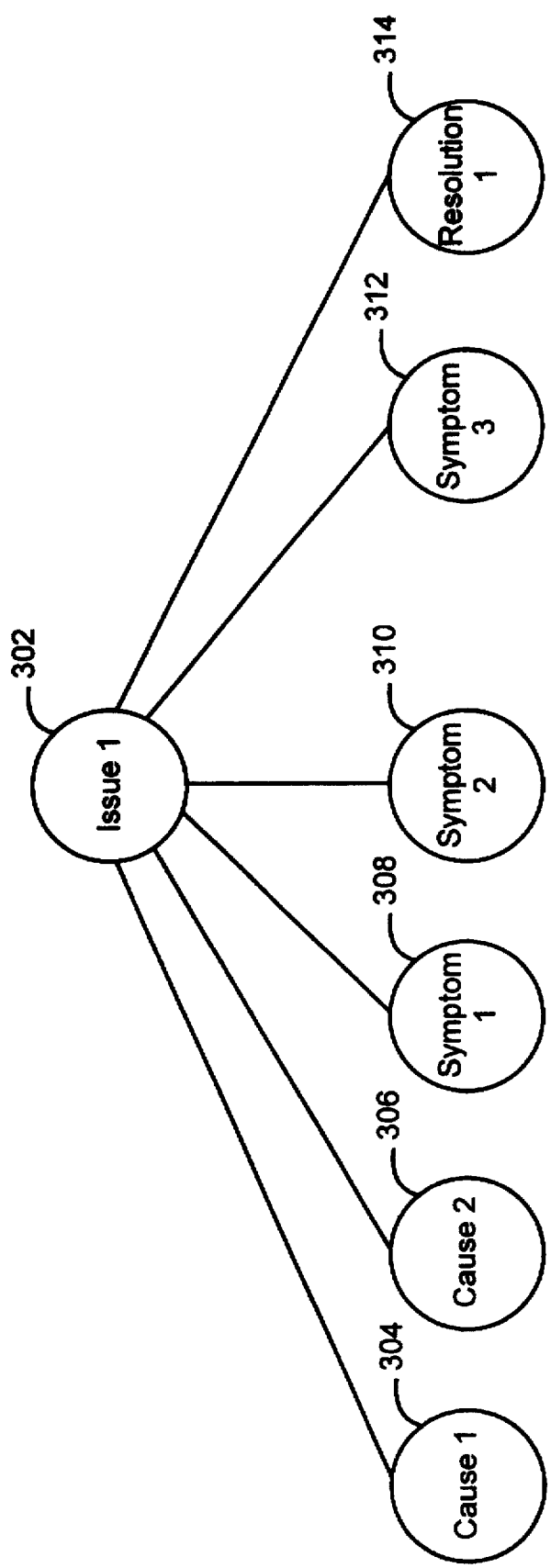
FIGS. 3A and 3B depict a relationship between data elements utilized by the preferred embodiment of the present invention.

In order to provide problem resolution, the preferred embodiment maintains information relating to cases. This information comprises six data elements: issues, causes, symptoms, resolutions, terms, and alternates. An "issue" represents a problem encountered by a user. As depicted in FIG. 3A, each issue 302 may have one or more causes 304, 306, symptoms 308, 310, 312, or resolutions 314 associated with the issue. A "cause" 304, 306 represents a single, independent factor whose presence is required for an issue 302 to exist. Causes 304, 306 represent one factor as opposed to compound factors and are independent of all other causes. That is, the set of causes 304, 306 for an issue 302 represents the basic elements that must be present for an issue to appear. For example, if an issue 302 has two causes 304, 306 associated with the issue, the issue is considered present only if all two causes are present.

A "symptom" 308, 310, 312 represents one or more factors which indicate a problem (issue) encountered by a user. For example, if the issue 302 were that the user was experiencing a software conflict where two pieces of software are version-incompatible, there may be symptoms 308, 310, 312 related to the issue indicating the presence of the issue. Such symptoms 308, 310, 312 may include a mouse device being unresponsive or the computer system being inoperable. A "resolution" 314 is a potential solution to the problem encountered by the user. Associated with each resolution 314 is a "cost". The cost is based on the monetary cost of implementing the resolution as well as the complexity cost of implementing the resolution. The complexity is expressed in terms of the amount of time necessary to implement the resolution. The preferred embodiment determines the cost associated with a resolution by utilizing a cost function. The cost function is a linear function receiving two parameters: the monetary cost and the complexity. The preferred embodiment uses the term "concept" to refer generically to a cause, symptom, or resolution.

Figure 3B:
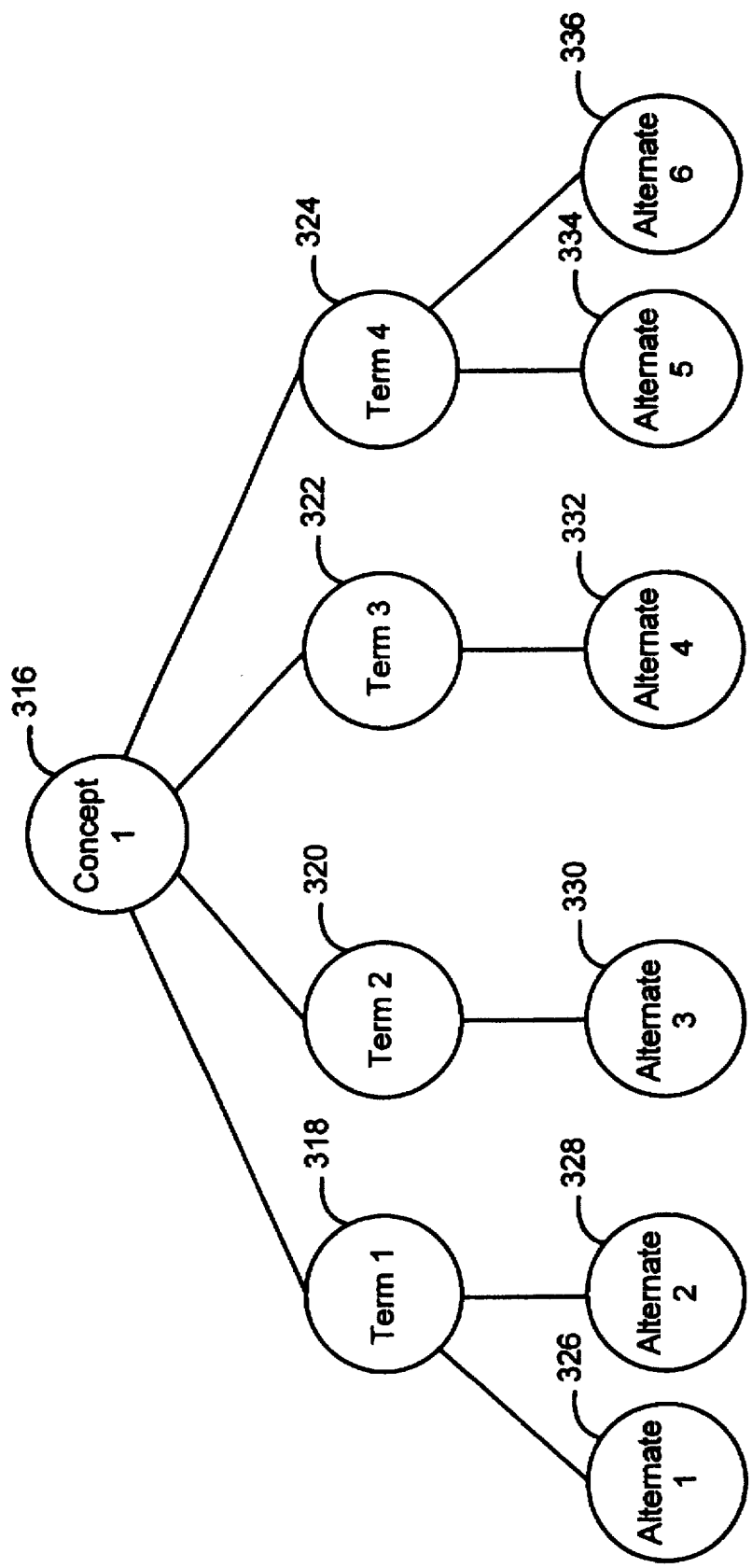

A "term" is a word or phrase that may be used to describe a concept. Thus, as depicted in FIG. 3B, there may be many terms 318, 320, 322, 324 associated with each concept 316. Associated with a term 318, 320, 322, 324 may be one or more alternates 326, 328, 330, 332, 334, 336. "Alternates" 326, 328, 330, 332, 334, 336 are synonyms or abbreviations for one or more terms 318, 320, 322, 324. Each alternate 326, 328, 330, 332, 334, 336, however, is synonymous with all concepts involving the term 318, 320, 322, 324 associated with the alternate. That is, the alternate 326, 328, 330, 332, 334, 336 cannot adopt a different meaning for different concepts.

Figure 4:
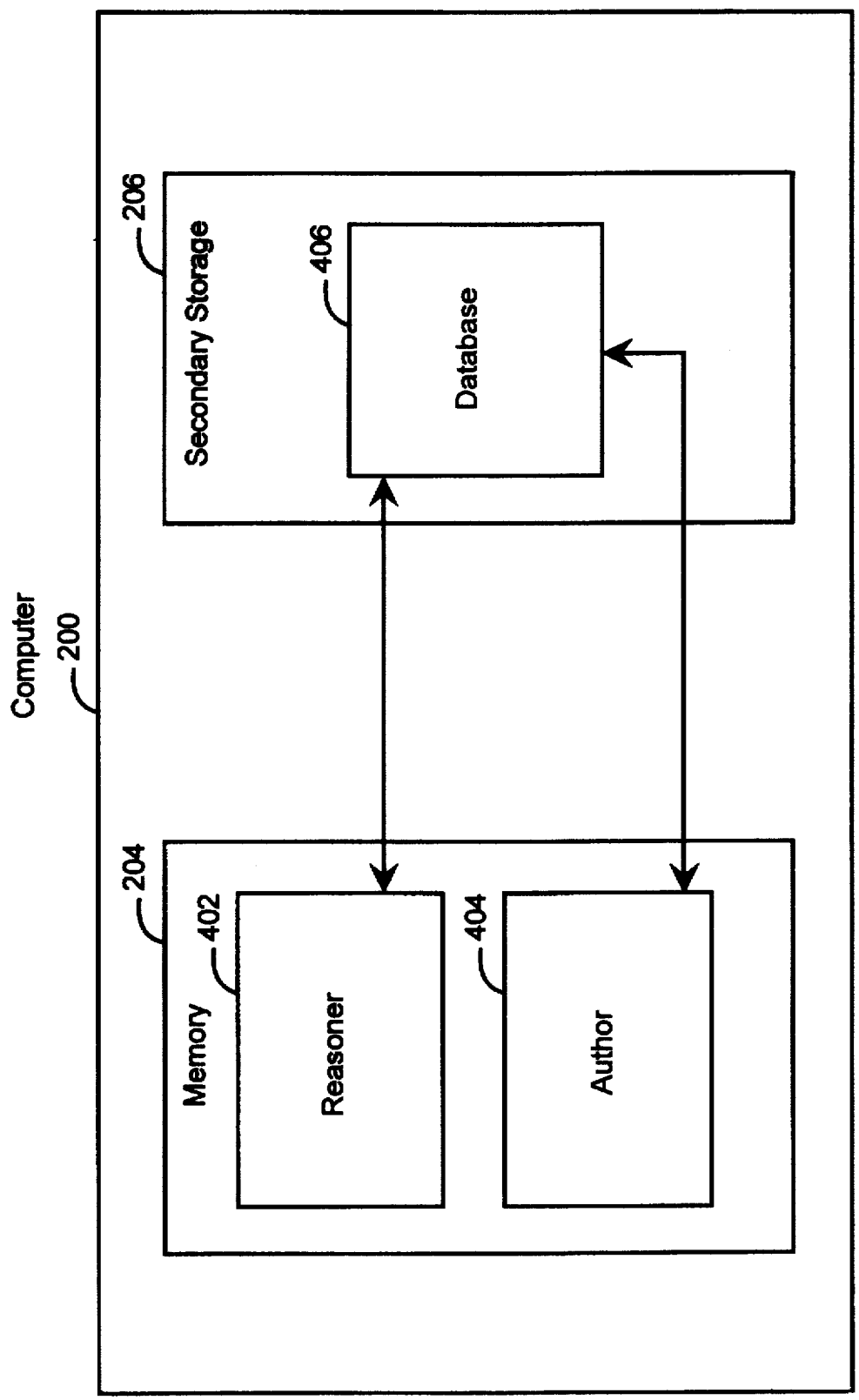
FIG. 4 depicts the reasoner component, the author component, and the database component of the preferred embodiment within the computer system of FIG. 2.

The CBR system of the present invention contains three components: an author component, a database component, and a reasoner component. FIG. 4 depicts the components of the present invention within computer 200. The memory 204 of computer 200 contains the author component 404 and the reasoner component 402. The secondary storage device 206 of the computer 200 contains the database component 406. The author component 404 is responsible for receiving user input, creating a belief network from the user input and storing the belief network into the database component 406. The belief network is stored in the database component 406 as a collection of records. The database component 406 is responsible for maintaining the belief network. The reasoner component 402 receives input from a user identifying a problem encountered by the user ("problem description"), accesses the belief network stored in the database component 406, and assists the user in solving the problem referred to by the problem description ("current problem"). The reasoner component 402 assists the user in solving the current problem by suggesting observations and resolutions to the current problem.

Figure 5:
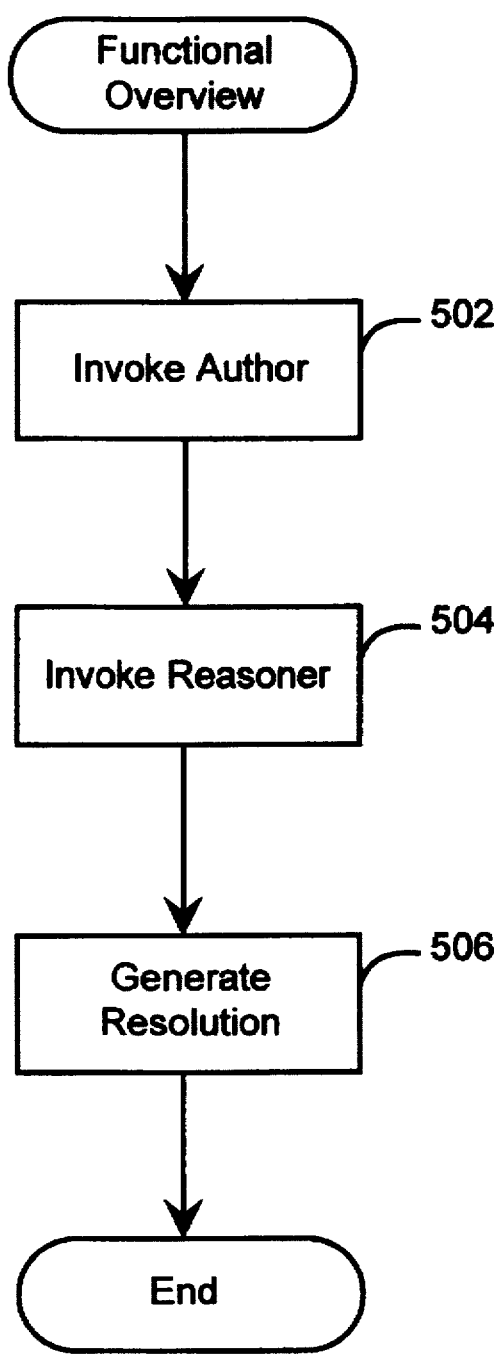
FIG. 5 depicts a functional overview of the preferred embodiment of the present invention.
Figure 6A:
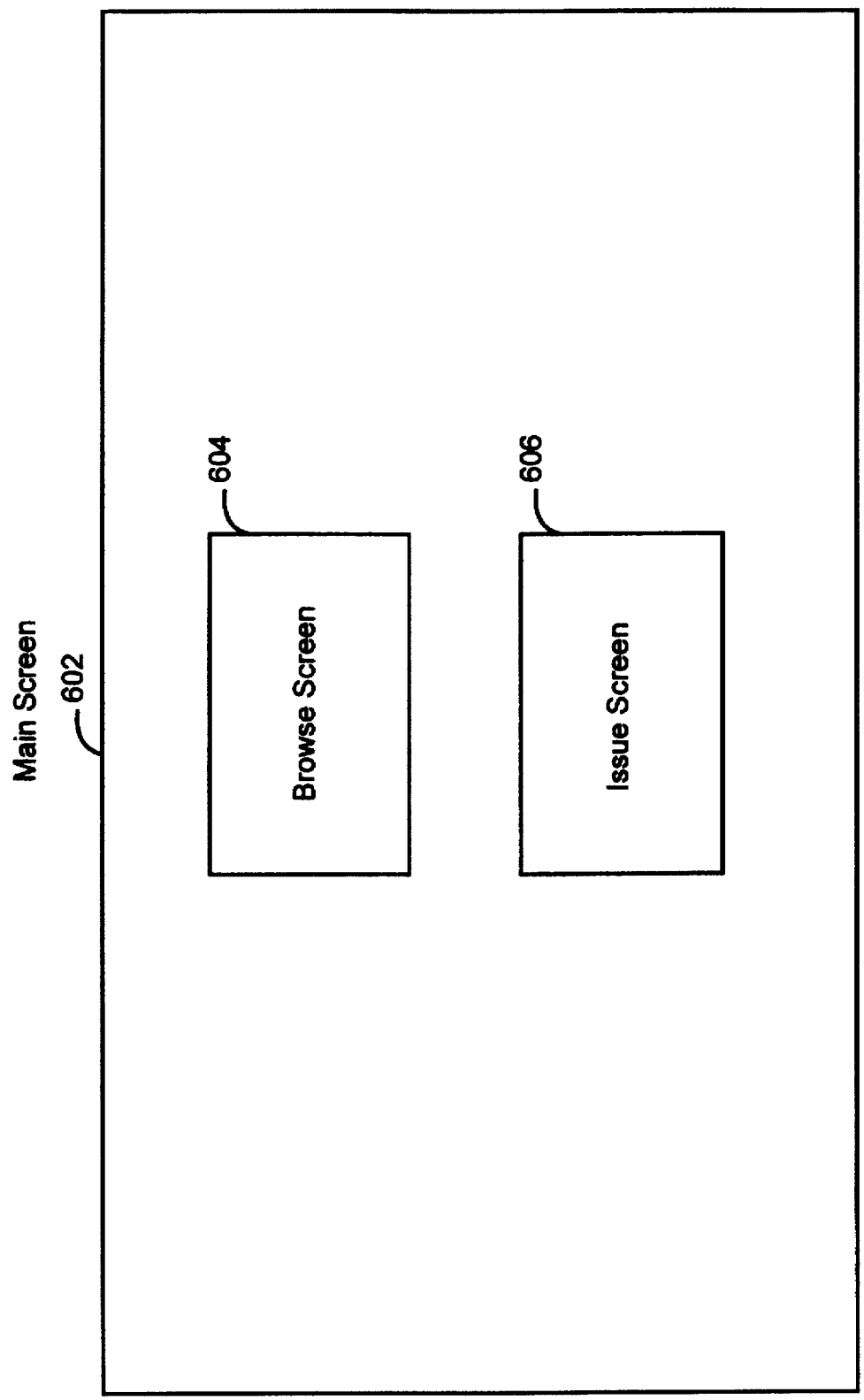
FIGS. 6A, 6B, 6C, 6D, 6E and 6F depict screens displayed to a user by the author component of the preferred embodiment.
Figure 6B:
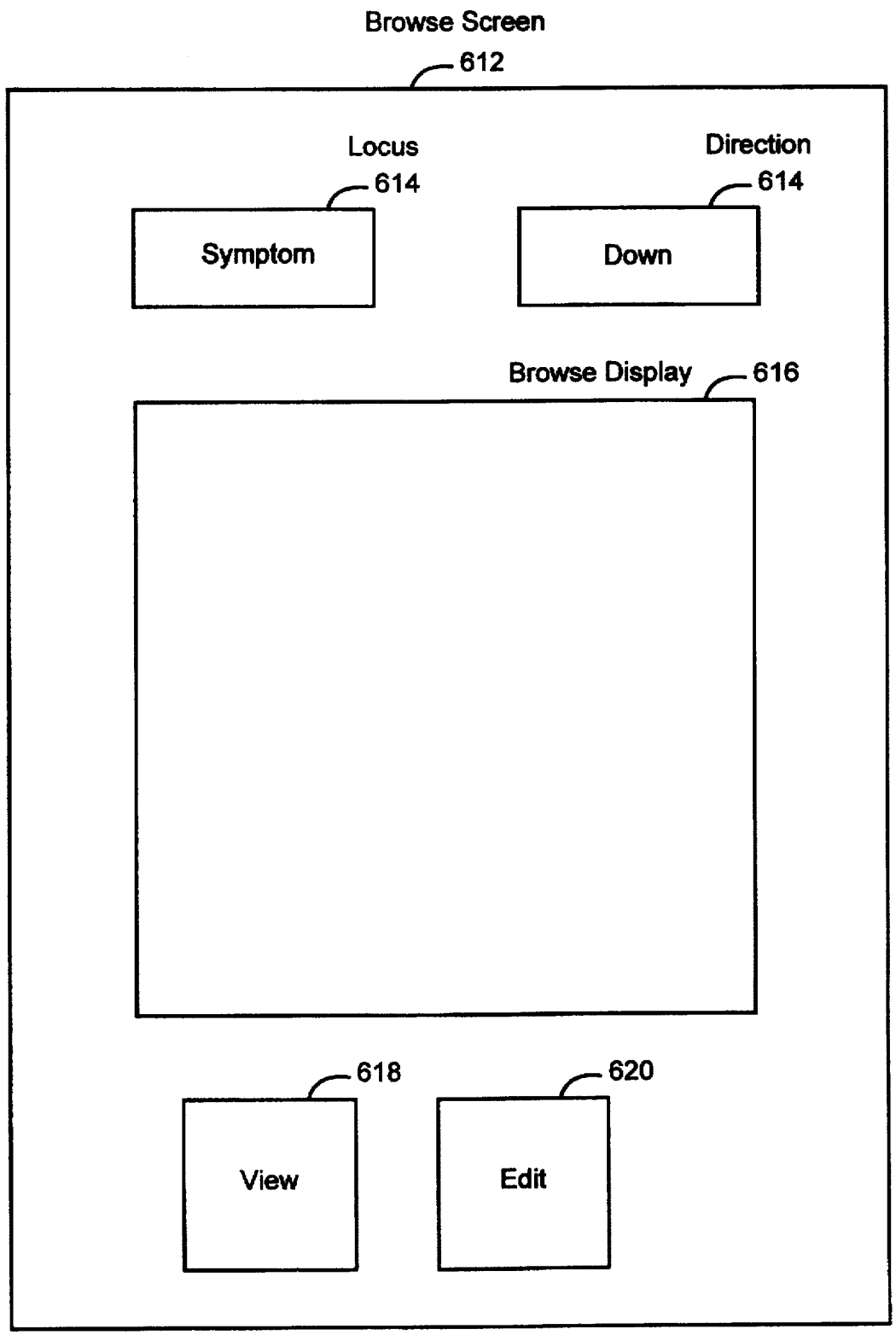
Figure 6C:
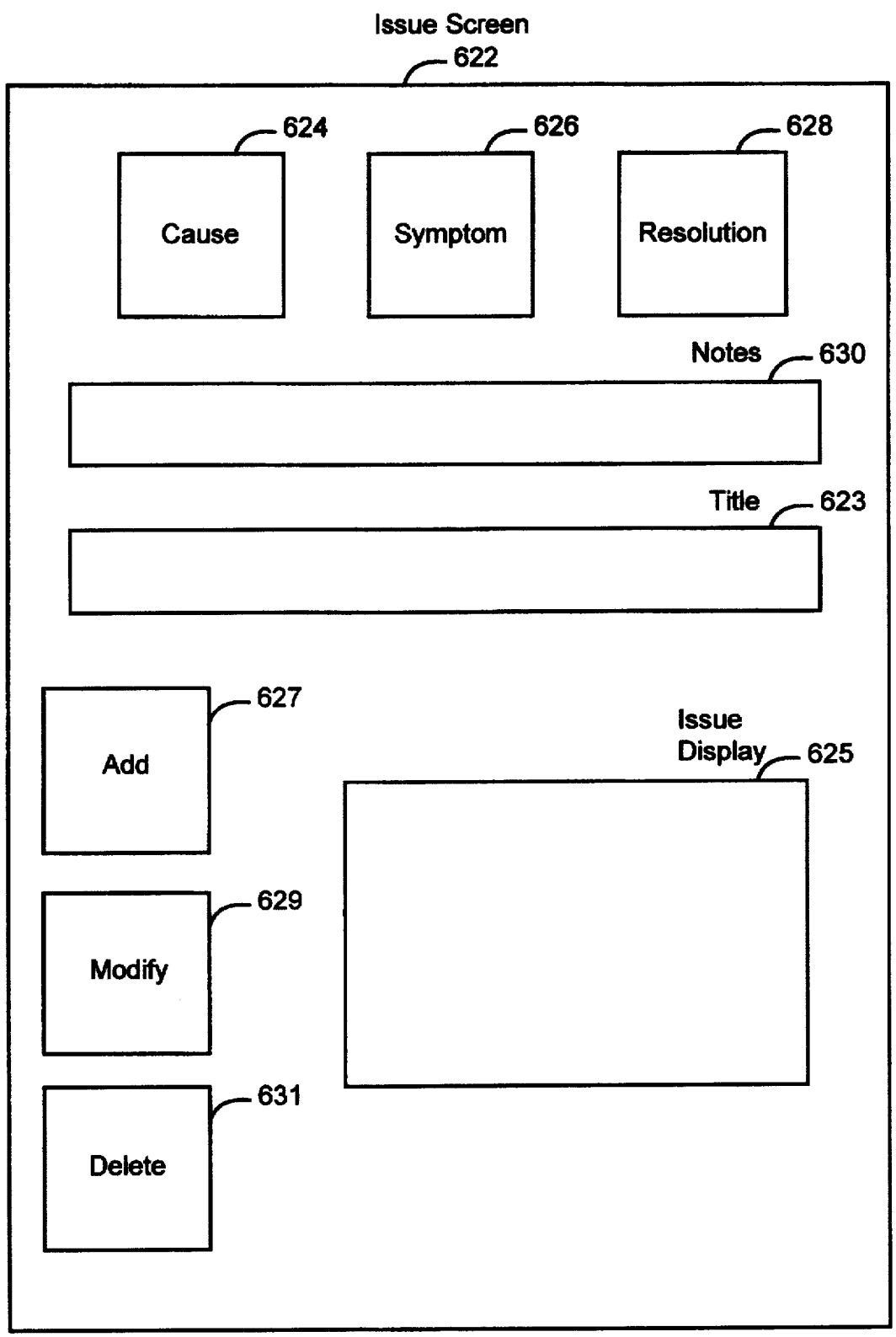
Figure 6D:
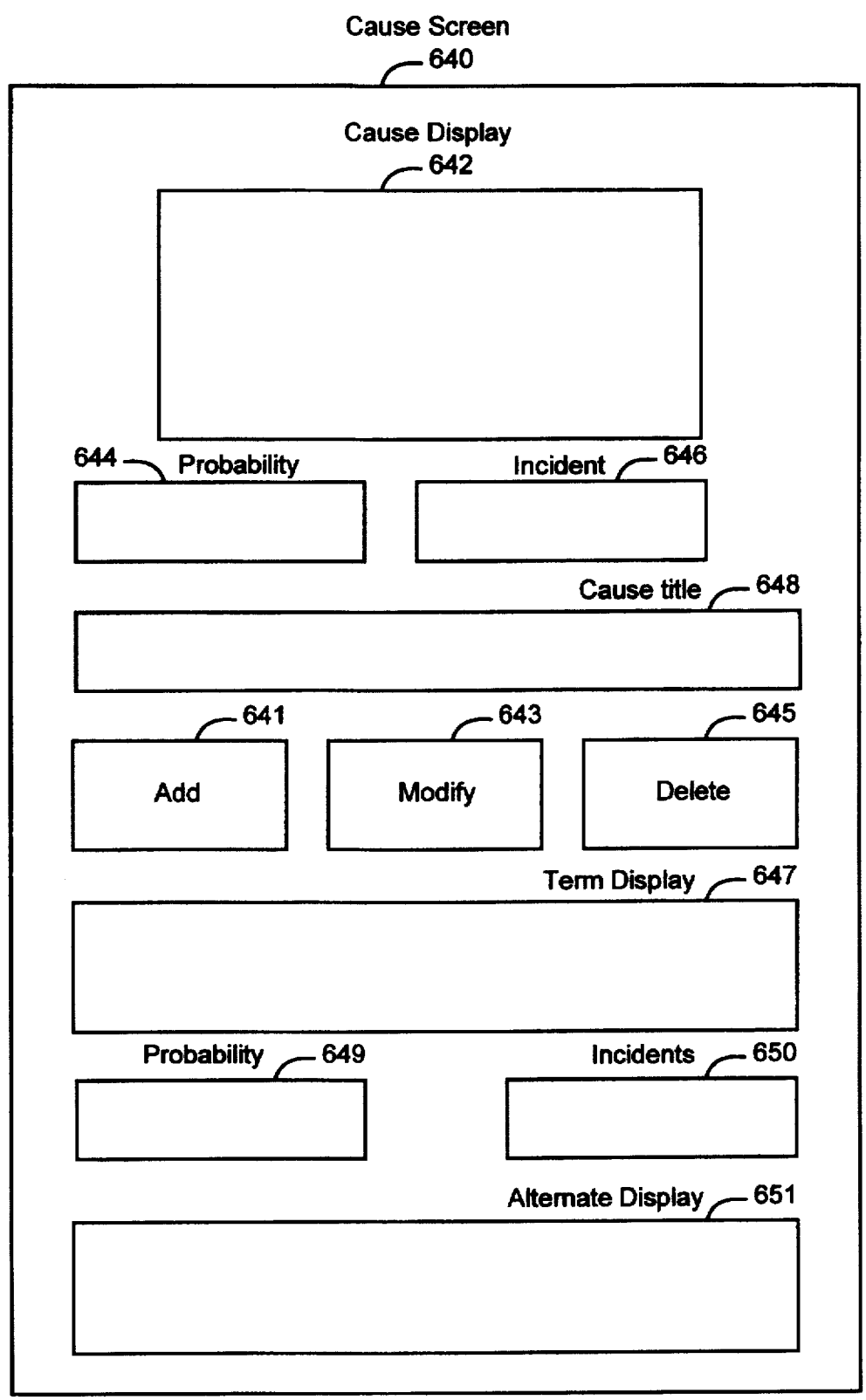
Figure 6E:
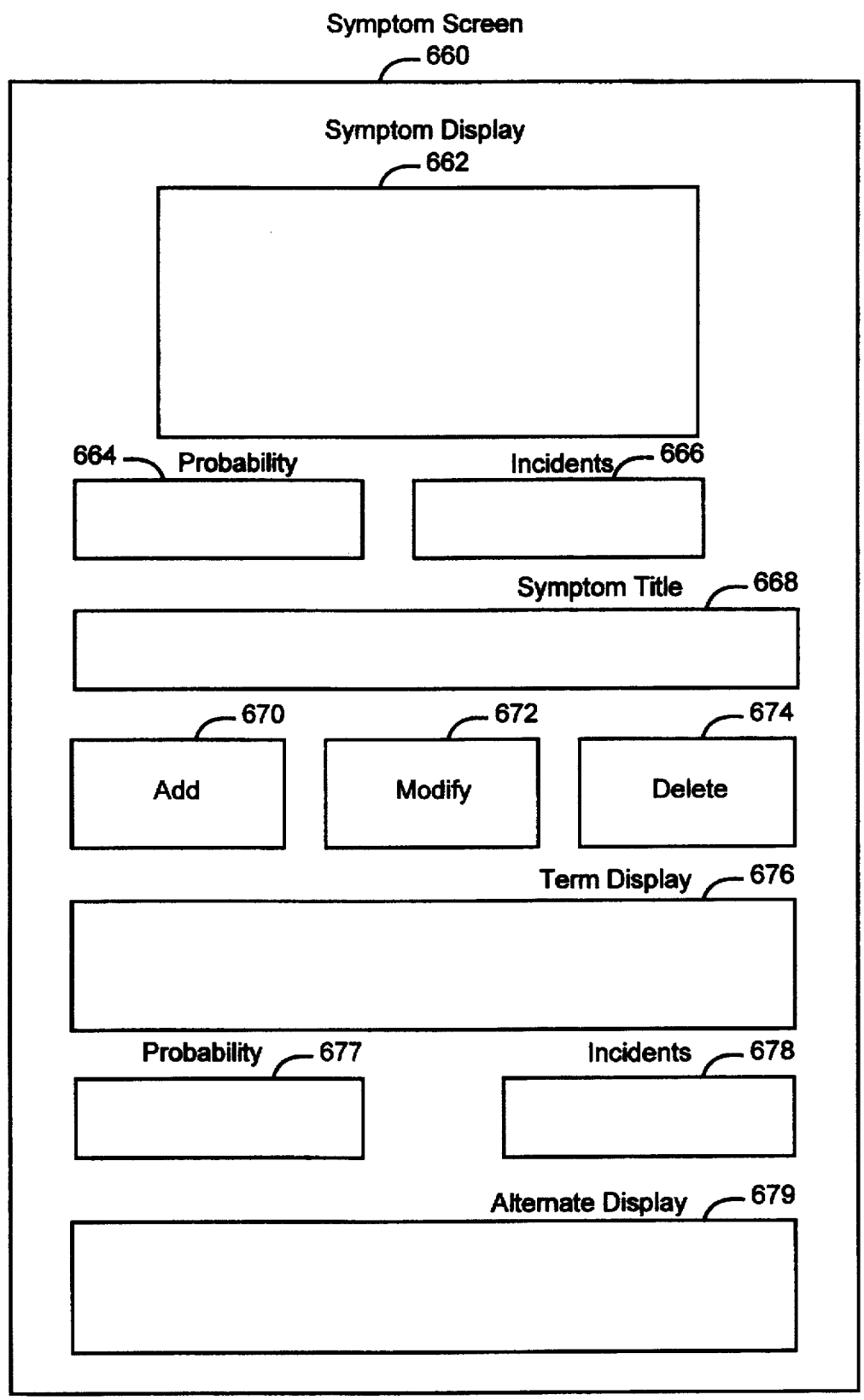
Figure 6F:
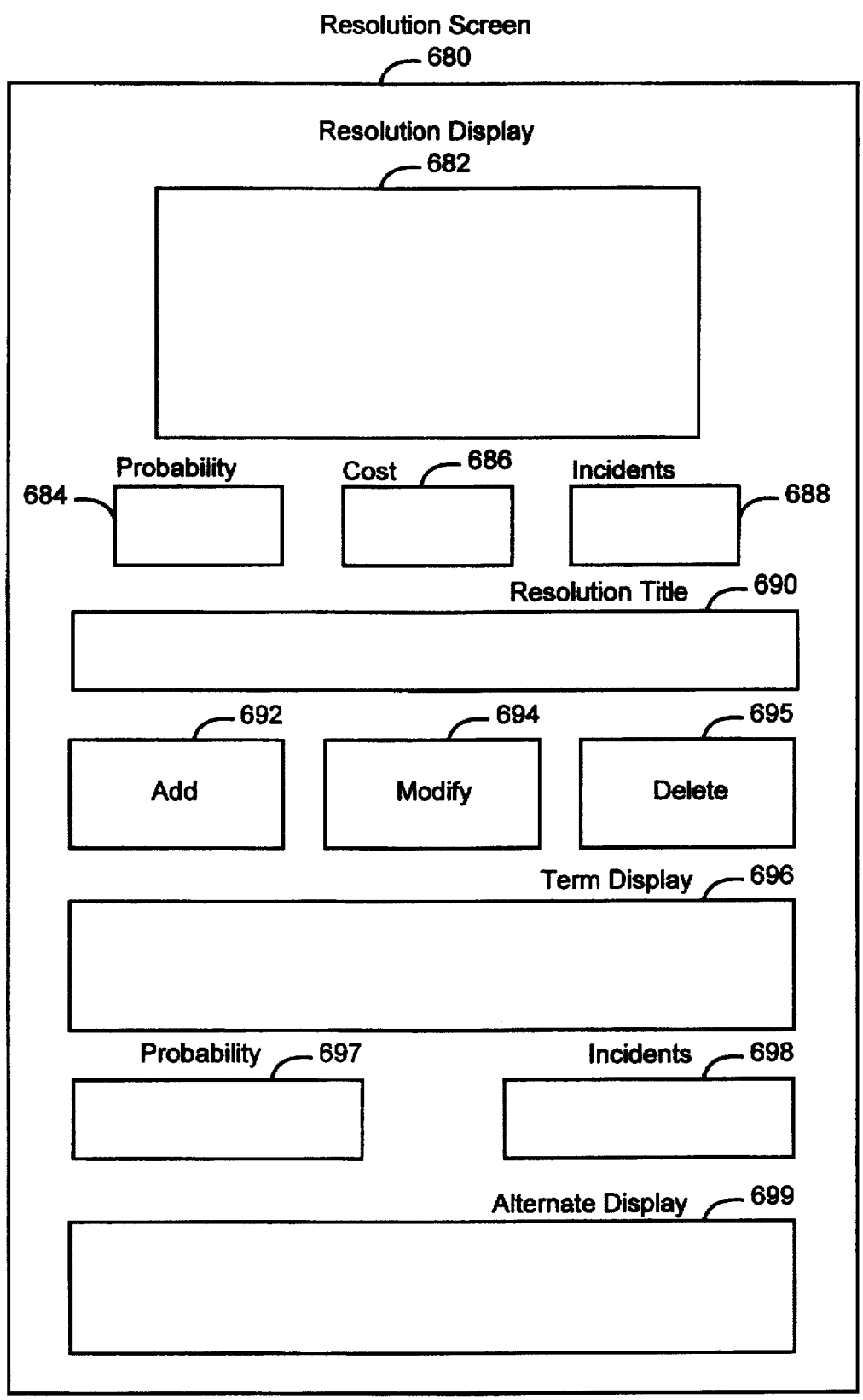

In utilizing the case-based reasoning system of the preferred embodiment, as shown in FIG. 5, a user invokes the author component 404 specifying information so that the author component can then create a belief network (step 502). The information specified by the user may include issues, concepts, terms, and alternates. After the author component 404 has been invoked and the belief network has been created, the user may then invoke the reasoner component for assistance with problem resolution (step 504). The reasoner component 402, upon invocation, will suggest questions to be answered by the user and generate ranked resolutions for the current problem (step 506). That is, the resolutions are listed in order of the likelihood that each resolution will solve the current problem and the cost associated with each resolution. The user may then implement a resolution to determine if the implemented resolution solves the current problem. Each of the above-mentioned steps will be discussed in more detail below. Step 502 is performed for initialization of the case-based reasoning system of the preferred embodiment. As such, this step may be performed off-line. Steps 504 and 506 are performed as part of the normal processing of the case-based reasoning system of the preferred embodiment.

As previously stated, the author component 404 is utilized to define issues and to associate concepts with the defined issues. In addition, the author component 404 is used for associating terms with the concepts, as well as associating alternates with the terms. After a user has input all of the previously described information into the author component 404, the author component 404 creates a belief network and stores the created belief network into the database component 406. In order to allow the user to input information into the author component 404, as depicted in FIGS. 6A, 6B, 6C, 6D, 6E, and 6F, the author component provides a number of screens that are displayed to the user: a main screen 602, a browse screen 612, an issue screen 622, a cause screen 640, a symptom screen 660, and a resolution screen 680. The main screen 602 of the author component 404 allows the user to display the browse screen 612 or the issue screen 622. The user displays the browse screen 612 or the issue screen 622 by selecting the browse screen button 604 or the issue screen button 606, respectively.

The browse screen 612 is used for traversing the belief network and for allowing the user to view and modify all of the information within the belief network. When viewing the browse screen 612, the user may select the locus pull down menu 614 and designate whether to display issues, causes, symptoms, resolutions, terms or alternates within the browse display 616. In addition, the user may select a direction for traversing the belief network by selecting a direction within the direction pull down menu 614. Upon viewing issues, concepts, terms or alternates within the display 616, the user may select an issue, concept, term or alternate and then choose to view information relating to the selection by selecting the view button 618 or the user may edit the selection by selecting the edit button 620.

The issue screen 622 is utilized to perform processing associated with issues. The issue display 625 depicts all issues currently within the belief network. After selecting an issue in the issue display 625, the user may choose to add, modify, or delete an issue by selecting the add button 627, the modify button 629 or the delete button 631, respectively. The title field 623 contains the name for a selected issue within the issue display 625. The notes field 630 contains notes associated with a selected issue within the issue display 625. After an issue has been selected within the issue display 625, the user may view the cause screen, the symptom screen, or the resolution screen to view or modify the causes associated with the selected issue, the symptoms associated with the selected issue, or the resolutions associated with the selected issue, respectively. In order to invoke the cause screen, the user selects the cause button 624. To view the symptom screen, the user selects the symptom button 626, and to view the resolution screen, the user selects the resolution button 628.

The cause screen 640 is utilized to perform processing associated with causes. Upon being confronted with the cause screen 640, the cause screen displays all of the causes associated with the selected issue in the cause display 642. The user may select a cause in the cause display 642 and choose to either add, modify, or delete a cause in the cause display 642. The user performs this functionality by selecting the add button 641, the modify button 643, or the delete button 645. If the user chooses to add a cause, the user inputs the cause name in the cause title field 648. The probability field 644 contains a probability indicating the likelihood that a selected cause within the cause display 642 will occur, regardless of any particular issue. The incidents field 646 contains the number of times that the selected cause in the cause display 642 was observed by the user. That is, the number of times, in the experience of the user, that the selected case was observed. Thus, the incidents is a confidence factor; the larger the number in the incidents field, the greater the confidence in the probability. After selecting a cause within the cause display 642, the user may assign terms to the selected cause by utilizing the term display 647. In assigning terms to the causes, the user can define a probability in the probability field 649 which indicates the likelihood that the term will be used to describe the associated cause. In addition, the user can input in the incidents field 650 the incidents for the term, which is the number of times that the selected cause was observed in the experience of the user and the term was used to indicate the selected cause. After defining terms for the selected cause, the user may associate alternates with the terms in the term display 647 by utilizing the alternate display 651.

The symptom screen 660 is utilized to perform processing associated with symptoms. The symptom screen 660 displays all of the symptoms associated with the selected issue in the symptom display 662. In utilizing the symptom screen 660, the user may choose to add a symptom, modify a symptom, or delete a symptom by selecting the add button 670, the modify button 672, or the delete button 674, respectively. If the user chooses to add a symptom, the user inputs the name of the symptom in the symptom title field 668. Associated with each symptom in the belief network, is a probability. The probability associated with each symptom is displayed in the probability field 664 and indicates the likelihood that a selected symptom in the symptom display 662 was associated with the selected issue in the experience of the user. The incidents field 666 contains the incidents, which is the number of times that a selected symptom was observed to be related to the selected issue. The user utilizes the term display 676 to associate terms with a selected symptom. Associated with each term is a probability displayed in the probability field 677 and the incidents displayed in the incidents field 678. The probability related to a term is the likelihood that the selected term will be associated with the selected symptom and the incidents related to a term is the number of times that the symptom was observed by the user and the term was used to indicate the symptom. The alternate display 679 allows the user to associate alternates with the terms in the term display 676.

The resolution screen 680 is utilized to perform processing associated with resolutions. The resolution screen 680 displays all of the resolutions associated with the selected issue in the resolution display 682. In utilizing the resolution screen 680, the user may add, modify, or delete a resolution by selecting the add button 692, the modify button 694, or the delete button 695, respectively. If the user chooses to add a resolution, the user inputs the name of the resolution in the resolution title field 690. Associated with each resolution is a probability, a cost, and incidents. The probability for a selected resolution is displayed in the probability field 684 and reflects the likelihood that the selected resolution will solve the selected issue. As previously stated, the cost associated with a selected resolution is displayed in the cost field 686 and reflects the monetary cost for implementing the selected resolution and the complexity for implementing the selected resolution. The incidents associated with a selected resolution is displayed in the incidents field 688 and reflects the number of times that the selected resolution solved the selected issue in the experience of the user. The term display 696 is used for associating terms with selected resolutions within the resolution display 682. Associated with each term in the term display 696 is a probability and incidents. The probability related to a term is displayed in the probability field 697 and reflects the likelihood that a term is associated with a selected resolution. The incidents related to a term is displayed in the incidents field 698 and reflects the number of times that a term was associated with a selected resolution in the experience of the user. The alternate display 699 is used for associating alternates with terms in the term display 696.

Figure 7A:
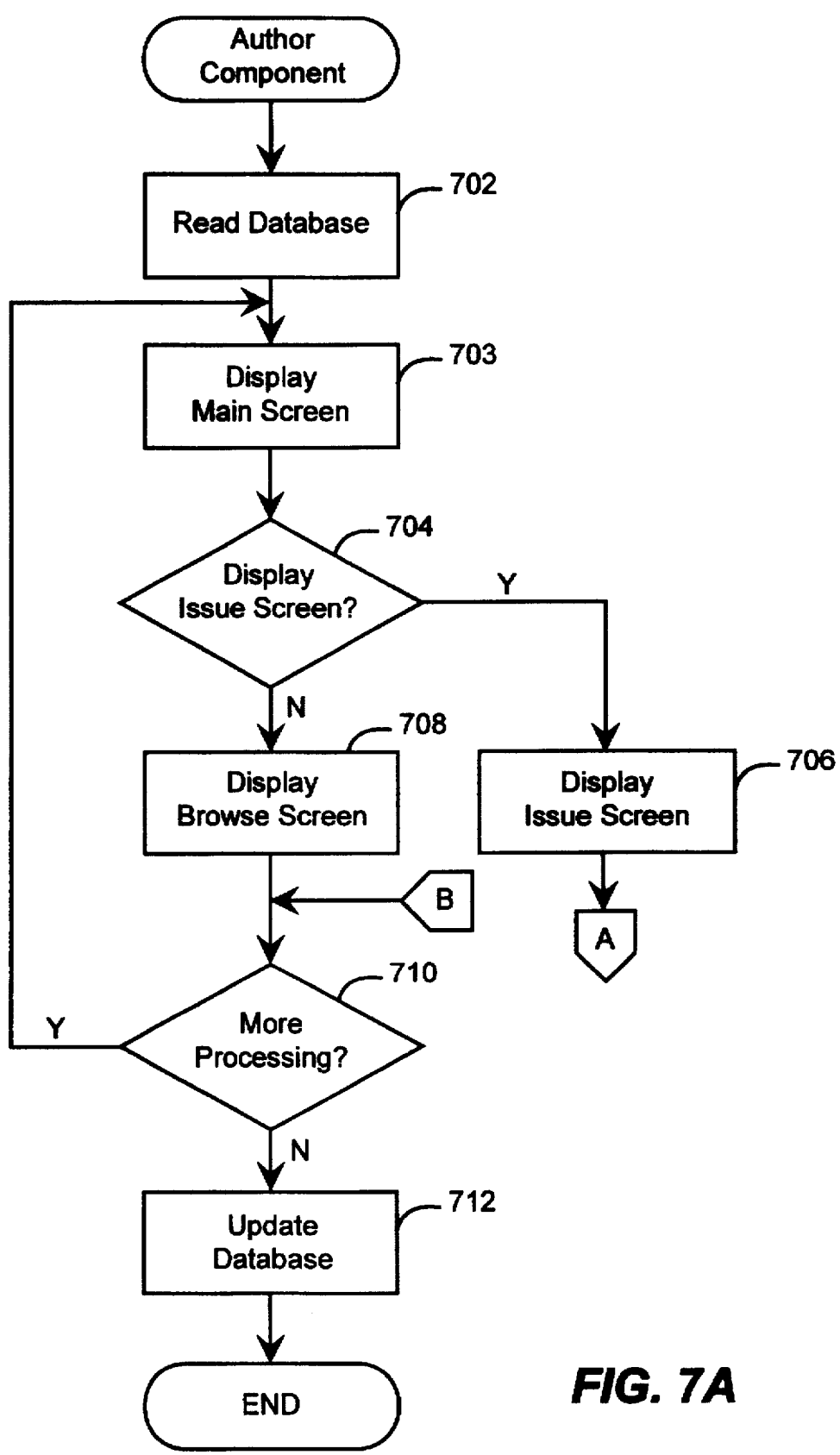
FIGS. 7A and 7B depict a flowchart of steps performed by the author component of the preferred embodiment of the present invention.
Figure 7B:
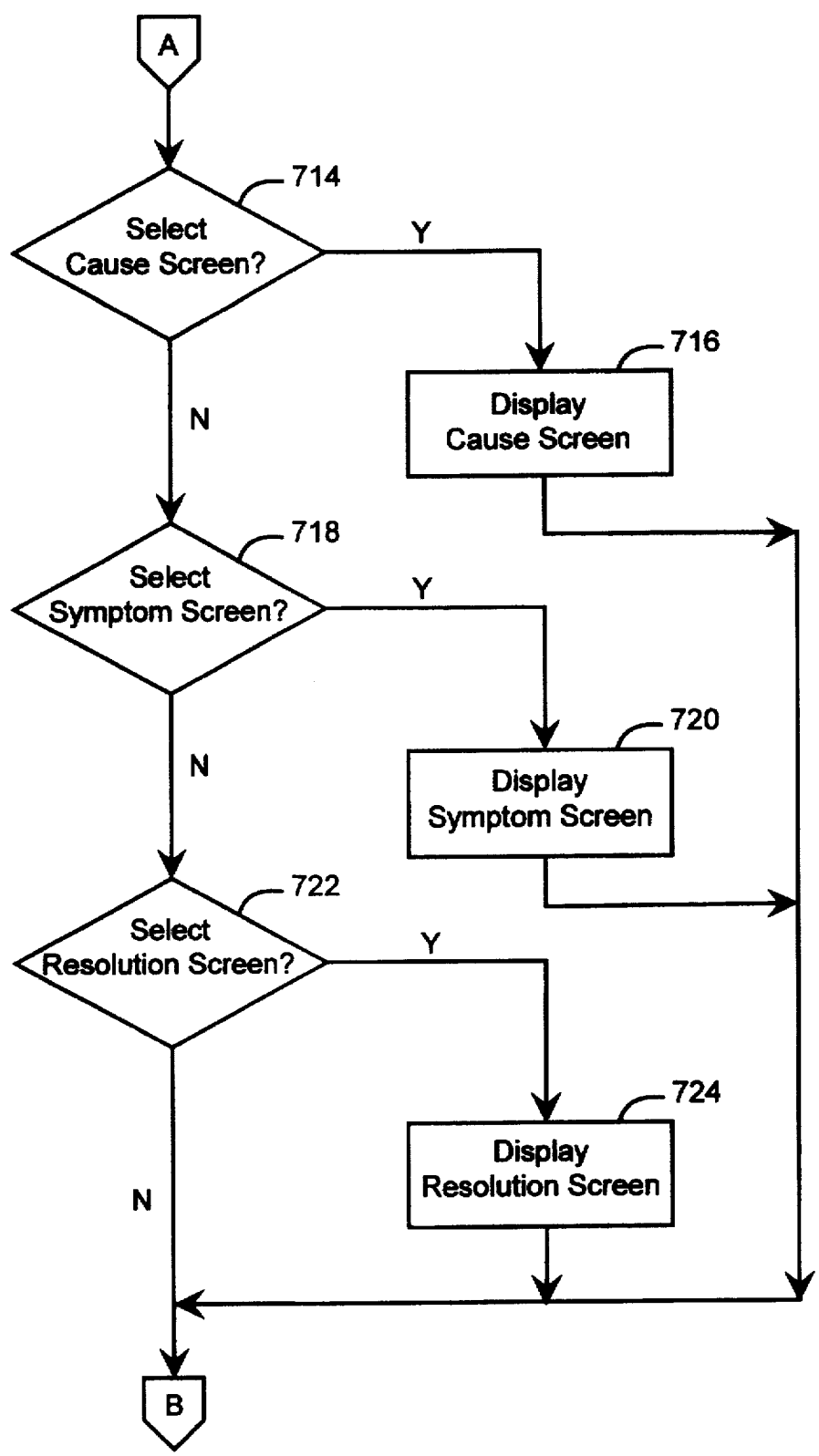

FIGS. 7A and 7B depict a flowchart of the steps performed by the author component 404 of the present invention. The first step the author component 404 performs is to read the records containing the belief network from the database component 406 (step 702). After reading the records containing the belief network, the author component 404 displays the main screen 602 to the user (step 703). When confronted with the main screen 602, the user may then select the issue screen 622 by selecting the issue screen button 606 (step 704). If the user does not select the issue screen 622, the user may invoke the browse screen 612 by selecting the browse screen button 604 wherein the user may traverse the belief network and view or modify all of the information contained in the belief network (step 708). After the user has utilized the browse screen 612, the user may cancel the browse screen and again view the main screen 602 (step 710). However, if the user selects the issue screen button 606, the author component 404 displays the issue screen 622 to the user (step 706). Upon being confronted with the issue screen 622, the user may add an issue or select a preexisting issue to view, modify or delete. The user may also add notes associated to the issue.

Upon selecting an existing issue or adding a new issue (the "indicated issue"), the user may invoke the cause screen 640, the symptom screen 660, or the resolution screen 680, by selecting either the cause button 624, the symptom button 626 or the resolution button 628, respectively. If the user selects the cause button 624 (step 714 in FIG. 7B), the author component 404 displays the cause screen 640 to the user (step 716). Upon being confronted with the cause screen 640, the user may associate new causes or existing causes with the indicated issue. After associating a new or an existing cause with the indicated issue, the user assigns a probability to the associated cause in the probability field 644. The user also indicates the incidents in the incidents field 646. The user then assigns terms for the cause. In assigning terms to the cause, the user defines a probability in the probability field 649 as well as the incidents for the term in the incidents field 650. After the terms have been defined, the user defines alternates for each term.

If, however, the user selects the symptom button 626 (step 718), the author component 404 displays the symptom screen 660 to the user (step 720). After displaying the symptom screen 660, the user can add, delete, or modify symptoms associated with the indicated issue. If the user adds or modifies a symptom associated with the issue, the user may adjust the probability associated with the symptom and the incidents associated with the symptom. The probability field 664 contains the probability and the incidents field 666 contains the incidents. The symptom screen also provides the user with the ability to assign terms to symptoms and alternates to terms similar to that as described relevant to the cause screen. If the user selects the resolution button 628 (step 722), the author component 404 displays the resolution screen 680 (step 724). After displaying the resolution screen 680, the user may add, modify, or delete resolutions associated with the indicated issue. When adding or modifying a resolution, the user can assign a probability associated with the resolution in the probability field 684. In addition, the user can input the incidents into the incidents field 688 and the cost associated with the resolution into the costs field 686. The resolution screen also provides the user with the ability to associate terms with the resolution and associate alternates with the terms similar to that described relevant to the cause screen. After the user has utilized the cause screen 640, the symptom screen 660, or the resolution screen 680, the user may go back to the main screen 602 to perform more processing (step 710). However, if the user has completed processing, the author component 404 updates the belief network in the database with the new or modified information and processing ends (step 712).

Figure 8:
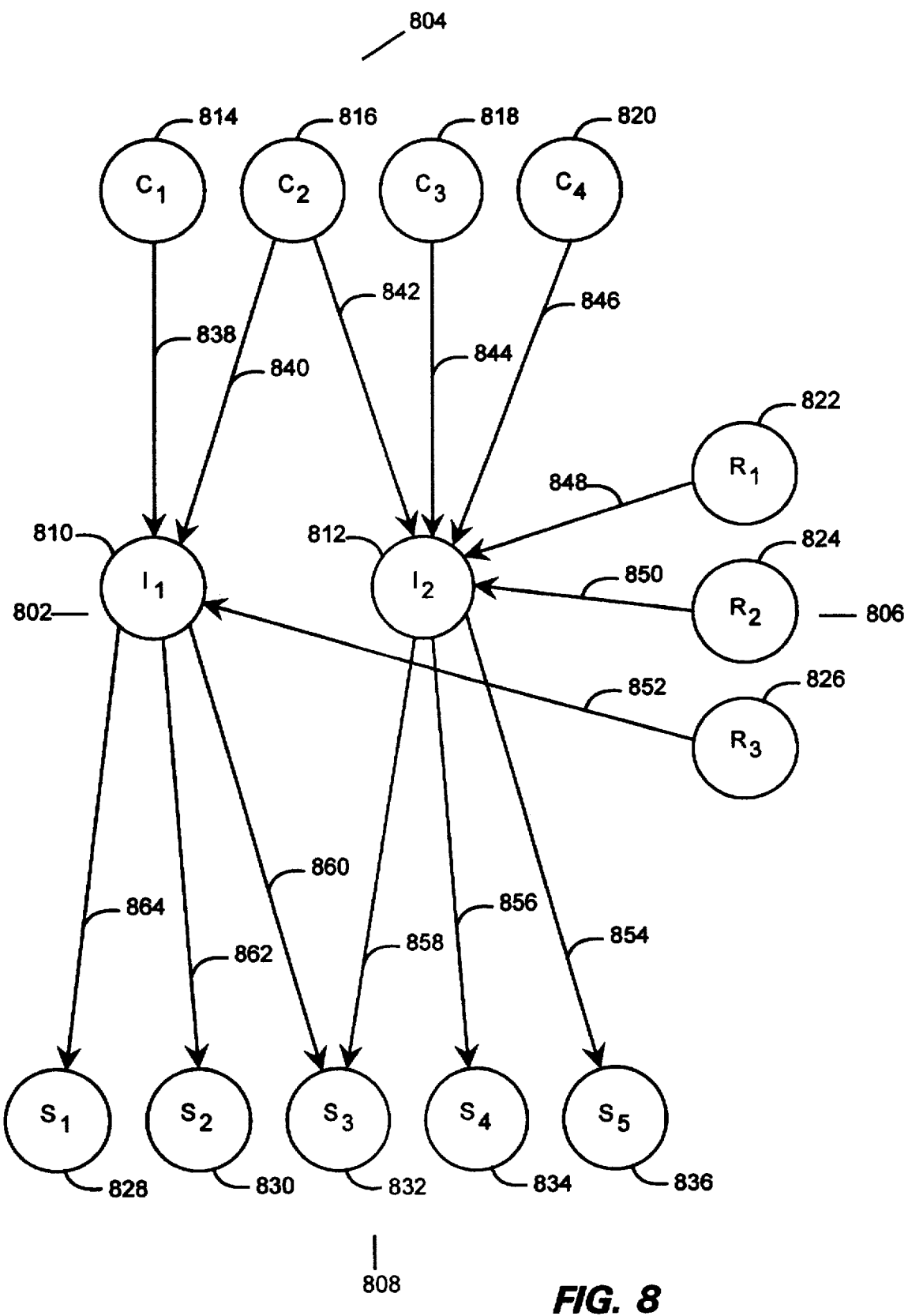
FIG. 8 depicts the belief network of the preferred embodiment of the present invention.

FIG. 8 depicts a logical representation of the belief network of the preferred embodiment as stored in the database component 406. The belief network of the preferred embodiment contains a node for each issue or problem that a user can encounter 802, nodes for the causes of each issue 804, nodes for the resolutions of each issue 806, and symptoms for each issue 808. All nodes in the belief network of the preferred embodiment correspond to Boolean variables. The issues 810, 812 depend upon the various causes associated with those issues as indicated by arcs 838, 840, 842, 844, and 846. For example, $I_1$810 depends from causes $C_1$814 and $C_2$816 as indicated by arcs 838 and 840. The issues in the belief network 810, 812 also depend from the resolutions 822, 824, 826 as indicated by arcs 848, 850, and 852. The nodes corresponding to the symptoms 828, 830, 832, 834, 836 in the belief network depend from the issues 810, 812 as indicated by arcs 854, 856, 858, 860, 862, and 864. As indicated, a cause can be related to more than one issue and more than one issue can be related to a symptom.

Each node in the belief network of the preferred embodiment is implemented as a record in the database component 406. Each arc in the belief network of the preferred embodiment is also implemented as a record in the database component 406. Specifically, the issue nodes 802 of the belief network of the preferred embodiment are stored in records according to the format depicted in Table 1.

TABLE 1

| FIELD NAME | DESCRIPTION | TYPE |
| --- | --- | --- |
| ID | Unique primary key. | LONG INT |
| TITLE | Title of the issue. | TEXT |
| NOTES | Explanatory notes about the issue. | TEXT |
| N_I_INIT | Initial number of incidents as input by the user. | LONG INT |
| N_I_DYNA | Dynamic number of incidents observed. That is, the number of incidents observed since the initial creation of the belief network. | LONG INT |
| N_I_DYNA_NEG | Number of negative incidents observed. That is, the number of times that the issue was observed to be false. | LONG INT |

The records in the database component 406 reflecting the cause nodes 804 adhere to the format indicated in Table 2.

TABLE 2

| FIELD NAME | DESCRIPTION | TYPE |
| --- | --- | --- |
| ID | Unique primary key. | LONG INT |
| TITLE | Title of the cause. | TEXT |
| NOTES | Explanatory notes about the cause. | TEXT |
| P_C | Cause probability. | LONG INT |
| N_I_INIT | Initial number of incidents assessed by the user. | LONG INT |
| N_I_DYNA | Dynamic number of incidents observed. That is, the number of incidents observed since the initial creation of the belief network. | LONG INT |
| N_I_DYNA_NEG | Number of negative incidents observed. That is, the number of times the cause was observed to be false for the indicated issue. | LONG INT |

The nodes 806 corresponding to the resolutions in the belief network of the preferred embodiment follow the record format depicted in Table 3.

TABLE 3

| FIELD NAME | DESCRIPTION | TYPE |
| --- | --- | --- |
| ID | Unique primary key. | LONG INT |
| TITLE | Title of the resolution. | TEXT |
| NOTES | Comments about the resolution. | TEXT |
| C_R | Cost of implementing resolution. | TEXT |

The nodes reflecting the symptoms 808 in the belief network of the preferred embodiment adhere to the format depicted in Table 4.

TABLE 4

| FIELD NAME | DESCRIPTION | TYPE |
| --- | --- | --- |
| ID | Unique primary key. | LONG INT |
| TITLE | Title of the symptom. | TEXT |
| NOTES | Comments about the symptom. | TEXT |

Each arc 838, 840, 842, 844, and 846 depicting a relationship between the cause nodes 804 and the issue nodes 802 are implemented as records in the database component 406 according to the format depicted in Table 5.

TABLE 5

| FIELD NAME | DESCRIPTION | TYPE |
| --- | --- | --- |
| ID | Unique primary key. | LONG INT |
| ISSUE_ID | Reference to the related issue. | LONG INT |
| CAUSE_ID | Reference to the related cause. | LONG INT |
| N_I_INIT | Initial number of incidents assessed by the user. | LONG INT |
| N_I_DYNA | Dynamic number of incidents observed. That is, the number of incidents observed since the creation of the belief network. | LONG INT |
| N_I_DYNA_NEG | Number of negative incidents observed. That is, the number of times that the cause was observed to be false for the issue. | LONG INT |

The arcs 848, 850, and 852 indicating the association between the resolution nodes 806 and the issue nodes 802 are implemented as records in the database component 406 according to the format depicted in Table 6.

TABLE 6

| FIELD NAME | DESCRIPTION | TYPE |
| --- | --- | --- |
| ID | Unique primary key. | LONG INT |
| ISSUE_ID | ID of related issue. | LONG INT |
| RESOLUTION_ID | ID of related resolution. | LONG INT |
| P_I_R | Probability that the resolution will fix the issue. | LONG INT |
| N_I_INIT | Initial number of incidents assessed by the user. | LONG INT |
| N_I_DYNA | Dynamic number of incidents observed through the life of the belief network. | LONG INT |
| N_I_DYNA_NEG | Number of negative incidents observed. | LONG INT |

For each arc 854, 856, 858, 860, 862, and 864 indicating an association between the issue node 802 and the symptom nodes 808, there is a corresponding record in the database component 406 that follows the format depicted in Table 7.

TABLE 7

| FIELD NAME | DESCRIPTION | TYPE |
| --- | --- | --- |
| ID | Unique primary key. | LONG INT |
| ISSUE_ID | Reference to the related issue. | LONG INT |
| SYMPTOM_ID | Reference to the related symptom. | LONG INT |
| P_S_I | Probability of the symptom given the issue. | LONG INT |
| N_I_INIT | Initial number of incidents assessed by the user. | LONG INT |
| N_I_DYNA | Dynamic number of incidents observed. | LONG INT |
| N_I_DYNA_NEG | Number of negative incidents observed. | LONG INT |

Figure 9:
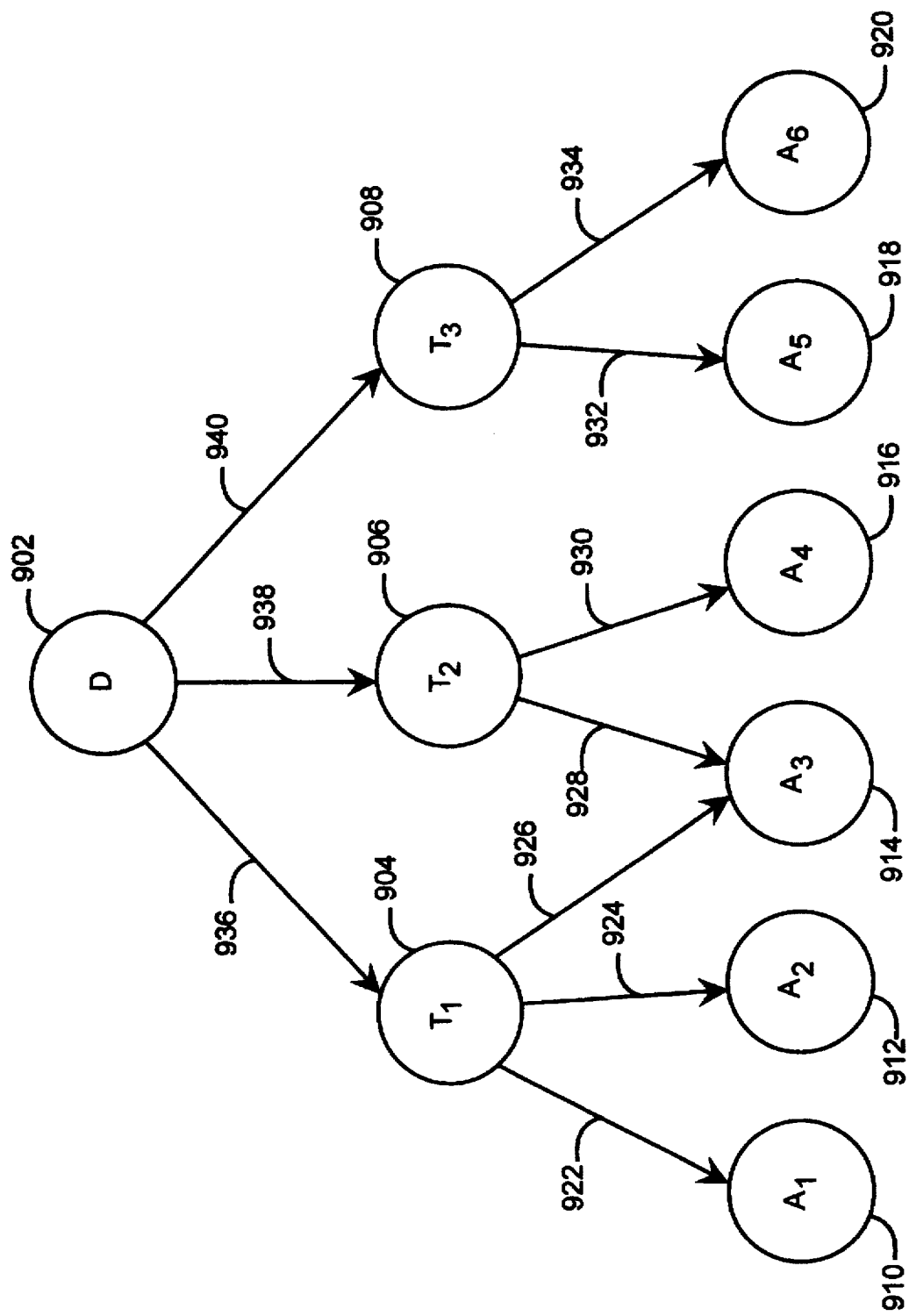
FIG. 9 depicts a more detailed diagram of the concepts in the belief network of FIG. 8.

FIG. 9 depicts a more detailed diagram of the concepts in the belief network of FIG. 8. As previously described, a concept is a cause, symptom, or resolution. Associated with each concept 902 can be a number of terms 904, 906, and 908 as indicated by arcs 936, 938, and 940. Further, associated with each term 904, 906, 908 can be a number of alternates 910, 912, 914, 916, 918, and 920 as indicated by arcs 922, 924, 926, 928, 930, 932, and 934. As depicted, more than one term 904, 906 may be associated with an alternate 914. The nodes 904, 906, and 908 corresponding to the terms in the belief network of the preferred embodiment are implemented as records in the database component 406. The records corresponding to the terms follow the format depicted in Table 8.

TABLE 8

| FIELD NAME | DESCRIPTION | TYPE |
| --- | --- | --- |
| ID | Unique primary key. | LONG INT |
| TITLE | Title of the term. | TEXT |
| NOTES | Comments about the term. | TEXT |

The nodes 910, 912, 914, 916, 918, and 920 corresponding to the alternates in the belief network of the preferred embodiment are implemented as records in the database component 406 following the format depicted in Table 9.

TABLE 9

| FIELD NAME | DESCRIPTION | TYPE |
| --- | --- | --- |
| ID | Unique primary key. | LONG INT |
| TITLE | Title of the alternate. | TEXT |

The arcs 922, 924, 926, 928, 930, 932, and 934 depicting an association between the terms and the alternates in the belief network of the preferred embodiment are implemented as records in the database component 406 according to the format depicted in Table 10.

TABLE 10

| FIELD NAME | | TYPE |
| --- | --- | --- |
| ID | Unique primary key. | LONG INT |
| TERM_ID | Reference to the related term. | LONG INT |
| ALTERNATE_ID | Reference to the related alternate. | LONG INT |

The arcs 936, 938, and 940 depicting an association between a concept and the terms associated with the concept are implemented as records in the database component 406 according to the format depicted in Table 11.

TABLE 11

| FIELD NAME | DESCRIPTION | TYPE |
| --- | --- | --- |
| ID | Unique primary key. | LONG INT |
| CONCEPT_ID | Reference to the related concept. | LONG INT |
| TERM_ID | Reference to the related term. | LONG INT |
| P_T_C | Probability that the term is used for the concept. | LONG INT |
| N_I_INIT | Initial number of incidents assessed by the user. | LONG INT |
| N_I_DYNA | Dynamic number of incidents observed. | LONG INT |
| N_I_DYNA_NEG | Number of negative incidents observed. | LONG INT |

Although the belief network of the preferred embodiment has been described as being stored in records of a database, one skilled in the art will recognize that other storage mechanisms can be used. In addition, although the records of the database component of the preferred embodiment have been described with a particular format, one skilled in the art will appreciate that additional or different fields can be used in the database component of the preferred embodiment.

As described relative to FIG. 5, the reasoner component 402 is responsible for accepting a problem description, assisting the user in solving the current problem by utilizing the belief network, and updating the probabilities in the belief network so as to increase the accuracy of the CBR system of the preferred embodiment for future invocations. In assisting the user with problem resolution, the reasoner component 402 utilizes a number of sets: $I_{current}$, $C_{obs}$, $S_{obs}$, $C_{poss}$, and $S_{poss}$. The set $I_{current}$ contains a number of issues to be scored. That is, the set of issues considered relevant to the current problem and that are under investigation by the reasoner component. The set $C_{obs}$ contains the causes that have been observed by the user. The set $S_{obs}$ contains the symptoms that have been observed by the user. The set $C_{poss}$ contains causes suggested for observation by the reasoner component 402. The set $S_{poss}$ contains symptoms suggested for observation by the reasoner component 402.

In describing the processing of the reasoner component 402, it is helpful to utilize various symbols, which are described below:

| Symbol | Description |
| --- | --- |
| $q_i = Pr(C_i)$ | Where "C" refers to a cause, "$q_i$" is the prior probability that cause "i" is present in a given case. |
| $C(I_j) = \{C_{j1}, C_{j2}, C_{j3}, \ldots\}$ | Where "I" refers to an issue, "$C(I_j)$" is the set of causes that define "j." |
| $S(I_j) = \{S_{j1}, S_{j2}, S_{j3}, \ldots\}$ | Where "S" refers to a symptom, "$S(I_j)$" is the set of symptoms associated with issue "j." |
| $R(I_j) = \{R_{j1}, R_{j2}, R_{j3}, \ldots\}$ | Where "R" refers to a resolution, "$R(I_j)$" is the set of resolutions associated with issue "j." |
| $P_k = Pr(S_k | I_j, \bar{I}_i, \forall i \neq j)$ | "$P_k$" is the probability of symptom "k" given only issue "j" is true, where $\bar{I}_i$ refers to issue "i" not being true. |
| $P_k^l = Pr(S_k | \bar{I}_j)$ | "$P_k^l$" is the probability ("leak probability") of symptom "k" given issue "j" is false. |
| $Pr(I_j \text{ Solved} | R_l)$ | This symbol is the probability that resolution "l" will solve issue "j." |
| $c_l$ | "$c_l$" is the cost of applying resolution "l." |
| $T(D_n) = \{T_{n1}, T_{n2}, T_{n3}, \ldots\}$ | Where "D" refers to a concept and "T" |

| Symbol | Description |
|---|---|
| | refers to a term, "$T(D_n)$" is the set of terms associated with concept "n." |
| $Pr(T_m|D_n)$ | This term refers to the probability that term "m" will be used to refer to concept "n." |
| $A(T_m) = \{A_{m1}, A_{m2}, A_{m3}, \ldots\}$ | "$A(T_m)$" is the set alternates associated with term "m." |
| $\emptyset$ | "$\emptyset$" refers to the empty set. |
| $\cap$ | This symbol is the intersection operator. |

Figure 10A:
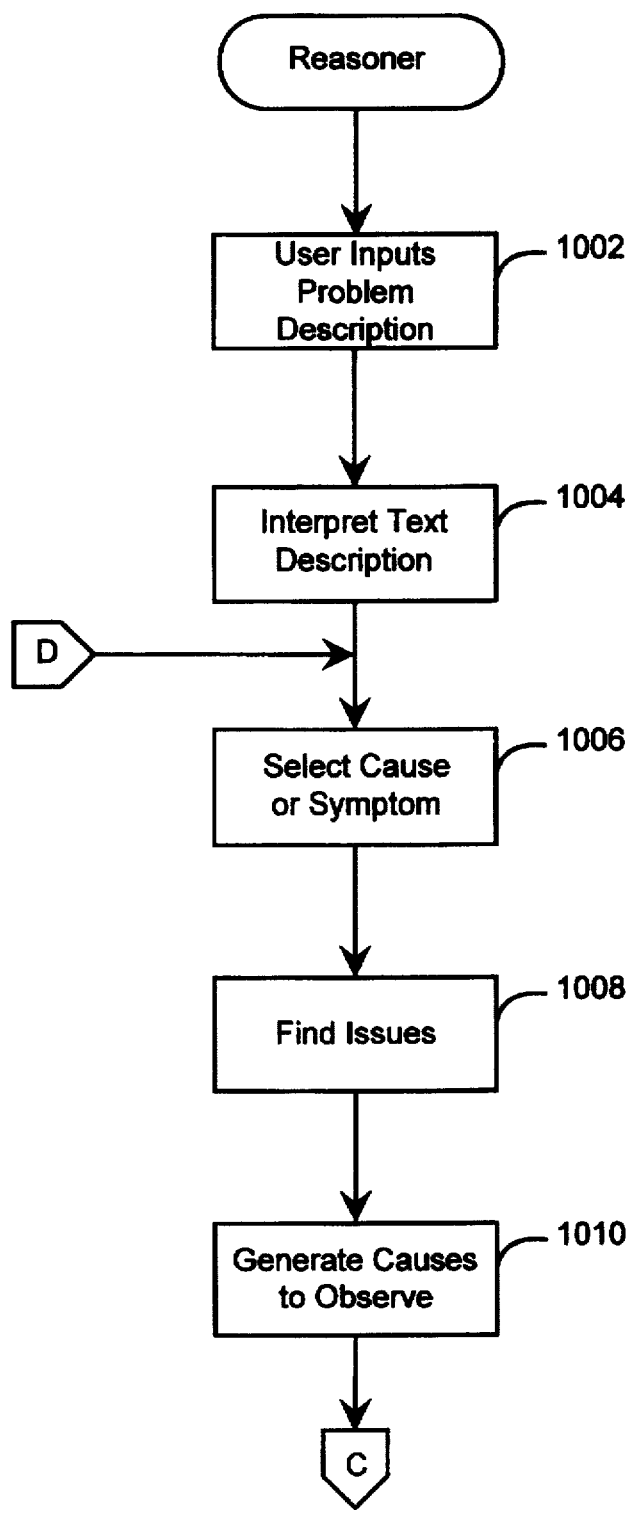
FIGS. 10A and 10B depict a flowchart of steps performed by the reasoner component of the preferred embodiment of the present invention.
Figure 10B:
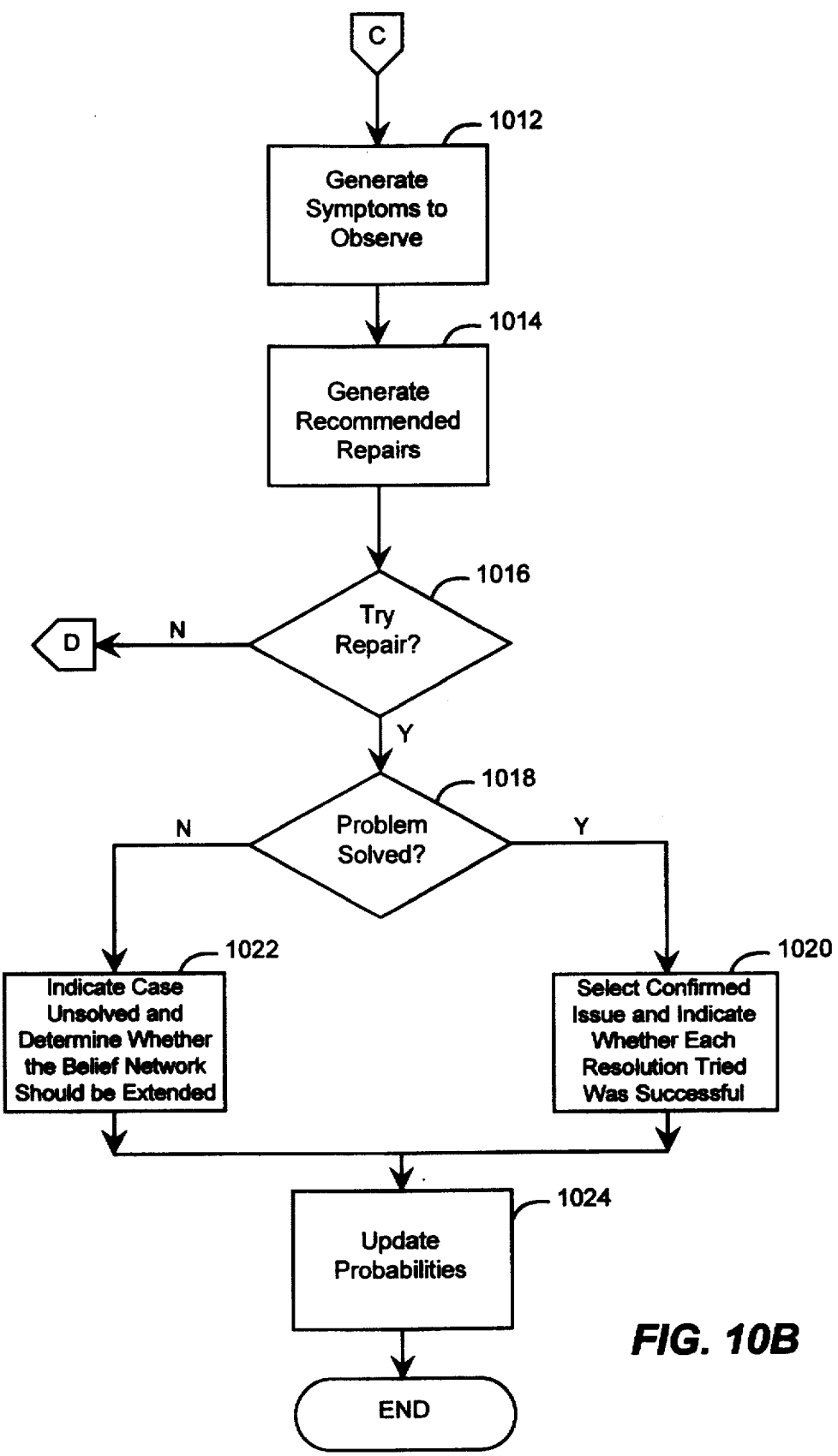

The first step that the reasoner component 402 performs, as indicated in FIGS. 10A and 10B, is to receive a problem description from the user (step 1002). After receiving the problem description, the reasoner component 402 interprets the problem description (step 1004). The reasoner component 402 performs this step by invoking the interpret text routine, described below, which returns a ranked list of causes ($C_{poss}$) and symptoms ($S_{poss}$). The reasoner component 402 then presents the user with the ranked lists $C_{poss}$ and $S_{poss}$, and the user selects either a cause from $C_{poss}$ and $S_{poss}$, indicating whether the selected cause or symptom is true or false (step 1006). After the user has indicated whether the selected cause or symptom is true or false, the selected cause or symptom is added to either $C_{obs}$ or $S_{obs}$, thereby indicating that the selected cause or symptom has been observed. Next, the reasoner component 402 finds all issues related to the causes and symptoms in $S_{obs}$ and $C_{obs}$ and places the found issues into the set $I_{current}$ (step 1008). That is, $$I_{current} = \{I_j | C(I_j) \cap C_{obs} \neq \emptyset \text{ or } S(I_j) \cap S_{obs} \neq \emptyset\} \quad (1)$$

In other words, $I_{current}$ contains all issues where at least one cause for the issue is in $C_{obs}$ or at least one symptom of the issue is in $S_{obs}$. Thus, $I_{current}$ contains the issues under investigation by the reasoner component 402. Next, the reasoner component 402 generates causes to observe (step 1010). That is, the reasoner component ranks and displays all of the causes in the set $C_{poss}$, where $$C_{poss} = \bigcup_{I \in I_{current}} C(I).$$

In performing this step, the reasoner component 402 utilizes the following equations:

$$EV_I(C_i) = Pr(C_i|E) \left( \frac{q_i - \prod_{C_j \notin E_C} q_j}{1 - \prod_{C_j \notin E_C} q_j} \right) + (1 - Pr(C_i|E)) \quad (2)$$

This formula calculates the expected value "$EV_I$" of observing a cause "$C_i$" and ranks the causes in $C_{poss}$ according to the expected values of the causes. In performing this calculation, formula 2 utilizes the total evidence observed. The total evidence "E" for an issue is a combination of both the symptoms observed "$E_s$" and the causes observed "$E_c$" for the issue. The symptoms observed "$E_s$" include the symptoms that are true (i.e., present), as well as those that are false "$\overline{E}_s$" (i.e., not present). Thus, $$E_s = \{E_s, \overline{E}_s\}$$

where $$E_s = \{S_i \in S(I) | S_i = true\}$$

$$\overline{E}_s = \{S_i \in S(I) | S_i = false\}$$

"$E_c$" is similarly defined to that of "$E_s$" except that the observations are with respect to causes, not symptoms.

In the definition of formula 2, "$q_i$" refers to the prior probability that cause "i" is present and "$q_j$" refers to the prior probability that cause "j" is present.

The term "$Pr(C_i|E)$" of formula 2 is defined by the following equation:

$$Pr(C_i|E) = Pr(I|E) + \left( \frac{q_i - \prod_{C_j \in C(I)} q_j}{1 - \prod_{C_j \in C(I)} q_j} (1 - Pr(I|E)) \right) \quad (3)$$

where $C_j \in C(I)$ refers to all causes associated with issue "I," where the term "$Pr(I|E)$" is defined by the following formula:

$$Pr(I|E) = \frac{\prod_{S_i \in E_S} p_i \prod_{S_i \notin E_S} (1-p_i) \prod_{C_i \notin E_C} q_i}{\prod_{S_i \in E_S} p_i \prod_{S_i \notin E_S} (1-p_i) \prod_{C_i \notin E_C} q_i + \prod_{S_i \in E_S} p_i^l \prod_{S_i \notin E_S} (1-p_i^l) \left( 1 - \prod_{C_i \notin E_C} q_i \right)} \quad (4)$$

where "$p_i$" refers to the probability of symptom "i" given only issue "i" is true, where "$p_i^l$" refers to the leak probability of symptom "i" and where "$q_i$" refers to the prior probability that cause "i" is present. In addition, "$S_i$" and "$C_i$" refer to symptoms and causes, respectively.

After the reasoner component 402 generates the causes to observe, the reasoner component generates symptoms to observe (step 1012 in FIG. 10B). In performing this step, the reasoner component 402 utilizes the following formula:

$$EV_I(S_i) = Pr(S_i|E) \left( 1 - \min\left( \frac{p_i}{p_i^l}, \frac{p_i^l}{p_i} \right) \right) + (1 - Pr(S_i|E)) \left( 1 - \min\left( \frac{1-p_i}{1-p_i^l}, \frac{1-p_i^l}{1-p_i} \right) \right) \quad (5)$$

This formula calculates the expected value "$EV_I$" of observing a symptom "$S_i$" and ranks the symptoms in $S_{poss}$ accordingly where $S_{poss} = \bigcup_{I \in I_{current}} S(I)$. Where the term "$Pr(S_i|E)$" is defined as:

$$Pr(S_i|E) = p_i Pr(I|E) + p_i^l (1 - Pr(I|E))$$

where "$P_i$" refers to the probability of symptom "i" given only issue "i" is true and "$p_i^l$" the leak probability. Where the term "$Pr(I|E)$" is calculated using formula 4 above.

Next, the reasoner component generates recommended repairs (step 1014). That is, the reasoner component ranks and displays the repairs contained in $R_{poss}$ by utilizing the following formula:

$$NetBenefit_{R_i} = B \sum_{j=1}^{n} Pr(I_j|E)Pr(I_j|Solved|R_i) - c_i \quad (6)$$

The above formula calculates which resolutions have the highest expected value "$NetBenefit_{R_i}$." The term "B" refers to a parameter indicating the value of a properly functioning computer system. The term "Pr(I_j|E)" is calculated using formula 4 above, the term "Pr(I_j Solved|R_i)" refers to the probability that resolution "i" will solve issue "j," and "$c_i$" refers to the cost of resolution "i."

After the recommended repairs have been generated, the user then has the option of whether to observe more causes or symptoms per step 1006 or whether to try a recommended repair (step 1016). If the user decides to observe more causes and symptoms, the reasoner component 402 continues to step 1006. However, if the user tries the recommended repair, processing continues to step 1018 where the user determines whether the recommended repair fixed the issue (step 1018). If the issue was fixed by the recommended repair, the user selects the issue (now referred to as a "confirmed" issue) and indicates whether each resolution tried was successful in solving the confirmed issue (step 1020). If the issue was not solved, the user indicates that the issue remains unsolved and determines whether the belief network should be extended to solve the unsolved issue (step 1022). That is, the user would invoke the author component 404 to create new issues, causes, symptoms, and resolutions so as to provide a solution to the issue that remained unsolved. The last step that the reasoner component 402 performs is to update the probabilities in the belief network (step 1024). The reasoner component 402 updates the probabilities so that the next time that the reasoner component is invoked, the reasoner component will be more accurate in resolving problems. This step is performed by invoking the update probabilities routine, described below.

Figure 11:
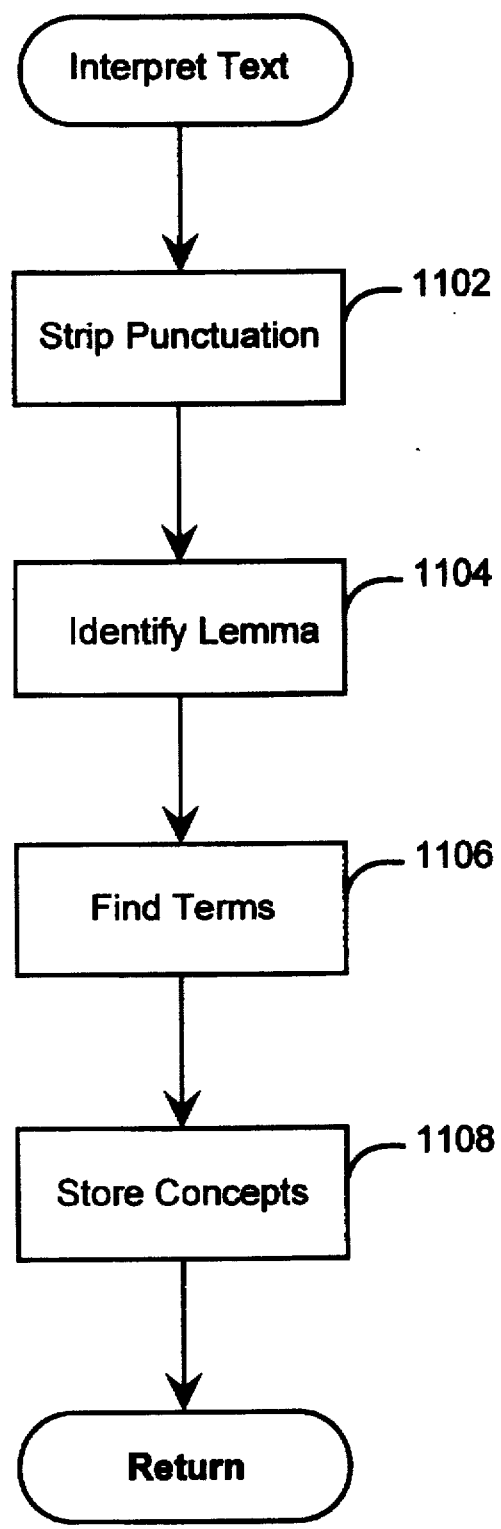
FIG. 11 depicts a flowchart of steps performed by the interpret text routine of the preferred embodiment of the present invention.

FIG. 11 depicts a flowchart of the steps performed by the interpret text routine of the preferred embodiment. The interpret text routine is invoked to provide a ranked list of causes and symptoms from the problem description. The first step of the interpret text routine is to strip the punctuation from the user input (step 1102). That is, the interpret text routine strips the punctuation and identifies individual words from the problem description. Next, the interpret text routine identifies the lemma for each word in the problem description (step 1104). The lemma of a word is the root associated with the word. For example, the lemma of "printers" is "printer," the lemma of "walking" is "walk," and the lemma of "gotten" is "get." Techniques for identifying the lemma of a word is well-known in the art. The next step of the interpret text routine is to find the terms associated with each lemma (step 1106). In this step, the interpret text routine determines the set of all terms associated with the problem description by matching the lemmas in the problem description to all of the alternates in the belief network. When an alternate is matched, the term associated with the alternate is added to a set ("$T_{in}$") indicating the set of terms associated with the problem description. That is, $$T_{in} = \{T_i | L \in L_{in} \text{ and } L \in A(T_i)\} \quad (7)$$

where "$T_i$" is a term, "L" is a lemma in the problem description, "$L_{in}$" is the set of all lemmas in the problem description and "$A(T_i)$" indicates the alternates associated with a term "$T_i$."

In matching lemmas to terms, if a lemma matches an alternate corresponding to more than one term, all of the associated terms are included into $T_{in}$. In addition, if a multiword sequence of lemmas matches a term, and a subsequence of the lemmas matches another term, only the term matching the longer of the two sequences is included in $T_{in}$. For example, if the input lemmas are "high performance" and there is an alternate for "high performance" and an alternate for "performance," only "high performance" is added into $T_{in}$. After finding all of the terms associated with the problem descriptions, the interpret text routine scores the concepts (step 1108). The concepts are scored by the interpret text routine using the following formula:

$$Pr(D|T_{in}) = \alpha \prod_{T_i \in T_{in}} Pr(T_i|D)Pr(D) \quad (8)$$

where "D" refers to a concept and where $$\alpha = \frac{1}{Pr(T_{in})}$$

is a normalizing coefficient. In utilizing the above formula, terms may be encountered in "$T_{in}$" that are not associated with the concept "D." In these instances, a default "miss" probability "$\epsilon$" is added to the terms:

$$\epsilon = Pr(T|D, T \notin T(D)) \quad (9)$$

Therefore, for example, in ranking two concepts $D_1$ and $D_2$, the following formula is used:

$$\prod_{T_i \in T_{in}} Pr(T_i|D_1)Pr(D_1) > \prod_{T_i \in T_{in}} Pr(T_i|D_2)Pr(D_2) \quad (10)$$

After all the concepts have been scored, the interpret text routine adds the ranked symptoms to $S_{poss}$ and the ranked causes to $C_{poss}$ and processing returns.

Figure 12:
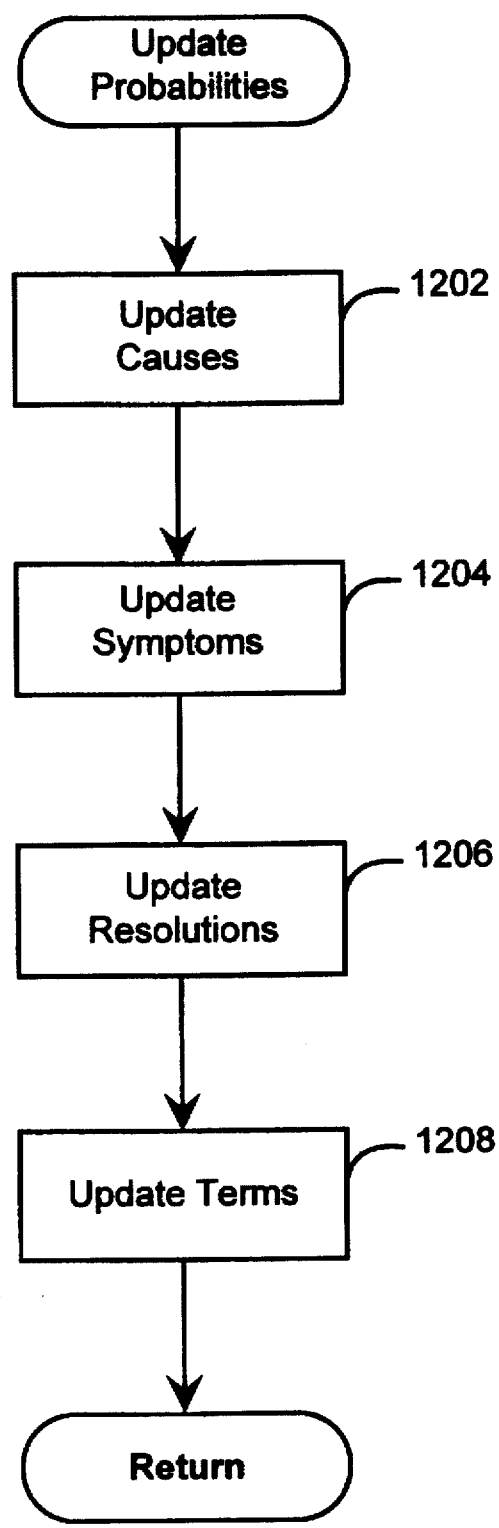
FIG. 12 depicts a flowchart of steps performed by the update probabilities routine of the preferred embodiment of the present invention.

FIG. 12 depicts a flowchart of the steps performed by the update probabilities routine of the preferred embodiment. The update probabilities routine updates the probabilities in the belief network after each invocation of the reasoner component 402. The update probabilities routine updates the probabilities for causes, symptoms, resolutions, and terms. The first step performed by the update probabilities routine is to update the probabilities associated with the causes in the belief network (step 1202). That is, for each cause in set $C_{obs}$ that was observed to be true or false, the probability contained within the belief network for the corresponding cause node is updated. The probability is updated using the following formula:

Let Pr(x) be the probability of a discrete binary random variable, that is where "x=true" written as "X" or "x=false" written as "$\bar{X}$." The expected value of the probability of "X," written "<Pr(X)>," is calculated from a set of observations regarding "x" as follows:

$$<Pr(X)> = \frac{n+1}{m + |x|} \quad (11)$$

where "n" is the number of observations where "x=true" (i.e., the incidents), "m" is the sample size or total number of observations, and |x| is the number of outcomes for the variable "x." Since the variables in the belief network of the preferred embodiment are Boolean variables, |x|=2.

In order to perform this calculation, during the invocation of the reasoner component 402, for every issue evaluated, the variable "n" associated with each cause, symptom, resolution or term is incremented if the cause, symptom, resolution or term is observed to be true. The variable "m"

is incremented for every issue evaluated if the cause, symptom, resolution or term is observed, regardless of whether the cause, symptom, resolution or term is true or false. The next step in the update probabilities routine of the preferred embodiment is to update the probabilities associated with the symptoms (step 1204). If the issue has been confirmed, the update probabilities routine updates each symptom in $S_{obs}$ in the same manner as that described relative to step 1202. After the probabilities associated with the symptoms are updated, the update probabilities routine updates the probabilities associated with the resolutions (step 1206). If an issue has been confirmed, for each resolution that was attempted, the update probabilities routine updates the probability for each resolution in the same manner as that used in step 1202. The last step of the update probabilities routine is to update the probabilities associated with the terms (step 1208). For each cause or symptom selected by the user in step 1006 of FIG. 10A, the probability for each term associated to the selected concepts is updated. If a term is associated to the concept and appears in the problem description, the probability for that term is updated positively. However, if a term is associated to the concept and does not appear in the problem description, the probability for the term is updated negatively.

The present invention provides an improved CBR system. The present invention is an improved CBR system by utilizing a belief network. By utilizing a belief network, the CBR system of the present invention is more accurate than conventional CBR systems and reduces storage requirements. In addition, by updating the probabilities in the belief network of the present invention, the CBR system of the present invention becomes more accurate after each invocation and prevents errors from repeatedly occurring. Further, the structure of the belief network of the present invention facilitates in assisting in problem resolution scenarios. That is, the belief network of the present invention utilizes six data elements: issues, causes, symptoms, resolutions and terms.

While the present invention has been described with reference to a preferred embodiment thereof, those skilled in the art will know of various changes in form that may be made without departing from the spirit and scope of the claimed invention as defined in the appended claims. Such changes may include different structures or data types used in the belief network, as well as different algorithms for updating the probabilities in the belief network.

We claim:

1. A case-based decision support system comprising:
   a storage device containing a belief network that contains knowledge obtained from observed cases so that the observed cases need not be stored, wherein each observed case is a problem resolution scenario previously resolved utilizing the belief network;
   a memory containing:
      an authoring component for receiving information from the user, creating the belief network from the received information, and storing the created belief network into the storage device; and
      a reasoning component for receiving input from the user describing the problem encountered by the user, accessing the belief network in response to the received input from the user, and generating a resolution to the problem encountered by the user utilizing the belief network; and
   a processing component for executing the authoring component and the reasoning component.

2. The case-based decision support system of claim 1 wherein the belief network contains variables for storing knowledge from observed cases comprising a plurality of types, wherein one type of the variables indicates problems of the user.

3. The case-based decision support system of claim 1 wherein the belief network contains variables for storing knowledge from observed cases comprising a plurality of types, wherein one type of the variables indicates causes for problems of the user.

4. The case-based decision support system of claim 3 wherein each variable indicating cause has terms associated with the variable indicating cause, the associated terms indicating a phrase acceptable for describing the cause of the problem.

5. The case-based decision support system of claim 4 wherein each term has alternates associated with the term, the associated alternates indicating alternative identifiers of the term.

6. The case-based decision support system of claim 1 wherein the belief network contains variables for storing knowledge from observed cases comprising a plurality of types, wherein one of the types of variables indicates symptoms for each problem of the user.

7. The case-based decision support system of claim 6 wherein each symptom variable has terms associated with the symptom variable, the associated terms indicating a phrase acceptable for describing the symptom.

8. The case-based decision support system of claim 7 wherein each term has alternates associated with the term, the associated alternates indicating alternative identifiers of the term.

9. The case-based decision support system of claim 1 wherein the belief network contains variables for storing knowledge from observed cases comprising a plurality of types, wherein one of the types of variables indicates resolutions to each problem of the user.

10. The case-based decision support system of claim 9 wherein each resolution variable has terms associated with the resolution variable, the associated terms indicating a phrase acceptable for describing a resolution.

11. The case-based decision support system of claim 10 wherein each term has alternates associated with the term, the associated alternates indicating alternative identifiers of the term.

12. The case-based decision support system of claim 1 wherein the belief network is stored in a database contained in the storage device.

13. In a computer system, the computer system having a belief network containing probabilities for likelihood of resolutions to problems encountered by users and a memory containing a reasoner component for receiving input from the user describing a problem encountered by the user, a method for performing case-based reasoning comprising the steps of:
   receiving input from the user into the reasoner component describing the problem encountered by the user;
   generating a resolution to the encountered problem by the reasoner component utilizing the belief network; and
   adjusting the probabilities in the belief network in response to the generated resolution.

14. The method of claim 13, further including the step of generating the belief network from user input, the belief network containing variables, arcs indicating relationships between the variables and probabilities indicating strength of the relationships between variables.

15. The method of claim 14 wherein the step of generating the belief network includes the steps of:
   generating the belief network containing a plurality of variables, a problem that the user can encounter corresponding to a variable; and for each variable corresponding to each problem of the user,
  generating variables indicating causes of the problem of the user;
  generating variables indicating symptoms of the problem of the user; and
  generating variables indicating resolutions to the problem of the user.

16. The method of claim 15 including the step of generating terms for the cause variables, the symptom variables and the resolution variables, the generated terms for each variable indicating a phrase acceptable for describing the variable.

17. The case-based decision support system of claim 16, wherein the step of generating terms includes the step of generating alternates for each term, an alternate indicating alternative identifiers acceptable for describing the term.

18. The method of claim 13, further including the step of generating a first list of causes for the problem encountered by the user in response to receiving the input.

19. The method of claim 18, further including the steps of:
  determining whether a cause in the first list of causes is observed by the user; and
  generating a second list of causes utilizing the probabilities in the belief network in response to determining whether the cause in the first list of causes is observed.

20. The method of claim 1, further including the steps of:
  determining whether a symptom in the first list of symptoms is observed by the user; and
  generating a second list of symptoms utilizing the probabilities in the belief network in response to determining whether the symptom in the first list of symptoms is observed.

21. The method of claim 13, further including the step of generating a first list of symptoms for the problem encountered by the user in response to receiving the input.

22. The method of claim 13 wherein the step of generating a resolution includes the step of generating a list of resolutions to the encountered problem, wherein the list of resolutions is ranked according to the probabilities in the belief network.

23. A case-based reasoning system for resolving a problem encountered by a user, comprising:
  a belief network for generating suggested resolutions to the encountered problem of the user, the belief network having probabilities that reflect knowledge from previously observed problem resolution scenarios; and
  a user interface component for interacting with the user, for receiving a description of the problem encountered by the user, for invoking the belief network to generate the suggested resolutions to the encountered problem, for updating the probabilities in the belief network to provide greater accuracy in resolving problems of the user, and for outputting the suggested resolutions to the user.

24. In a computer system, the computer system having a belief network for resolving problems of a user, the belief network having probabilities and a plurality of types of variables, the belief network storing knowledge from previously observed problem resolution scenarios, one type of variable indicating problems of a user, one type of variable indicating causes for the problems of the user, one type of variable indicating symptoms for the problems of the user, one type of variable indicating resolutions to the problems of the user, one type of variable indicating terms acceptable for describing causes, symptoms and resolutions, and one type of variable indicating alternates acceptable for identifying the terms, a method for performing case-based reasoning comprising the steps of:
  invoking the belief network to suggest resolutions to a problem encountered by file user;
  generating the suggested resolutions by the belief network; and
  updating the probabilities in the belief network to provide greater accuracy in resolving problems of the user.

25. A computer-readable medium whose contents cause a computer system to perform case-based reasoning, the computer system having a belief network containing probabilities for likelihood of resolutions to problems encountered by users and a memory containing a reasoner component for receiving input from the user describing a problem encountered by the user, by performing the steps of:
  receiving input from the user into the reasoner component describing the problem encountered by the user;
  generating a resolution to the encountered problem by the reasoner component utilizing the belief network; and
  adjusting the probabilities in the belief network in response to the generated resolution.

26. A computer-readable medium whose contents cause a computer system to perform case-based reasoning, the computer system having a belief network for resolving problems of a user, the belief network having probabilities and a plurality of types of variables, the belief network storing knowledge from previously observed problem resolution scenarios, by performing the steps of:
  invoking the belief network to suggest resolutions to a problem encountered by the user;
  generating the suggested resolutions by the belief network; and
  updating the probabilities in the belief network to provide greater accuracy in resolving problems of the user.

27. A method for resolving problems by a case-based reasoning system in a computer system having a belief network with probabilities indicating likelihoods of resolutions solving problems encountered by users, comprising:
  receiving a plurality of observed cases, wherein each observed case is a problem resolution scenario previously resolved by the case-based reasoning system;
  for each of the received plurality of observed cases,
    extracting knowledge from the observed case, wherein the knowledge influences the probabilities of the belief network;
    updating the probabilities of the belief network based on the extracted knowledge; and
    discarding the observed case;
  receiving input from a user describing a problem encountered by the user; and
  accessing the belief network and examining the probabilities to generate a resolution to the problem encountered by the user in response to receiving the input.

28. A computer-readable medium whose contents cause a case-based reasoning system in a computer system to resolve problems, the computer system having a belief network with probabilities indicating likelihoods of resolutions solving problems encountered by users, by performing the steps of:
  receiving a plurality of observed cases, wherein each observed case is a problem resolution scenario previously resolved by the case-based reasoning system;

for each of the received plurality of observed cases,
extracting knowledge from the observed case, wherein the knowledge influences the probabilities of the belief network;
updating the probabilities of the belief network based on the extracted knowledge; and
discarding the observed case;

receiving input from a user describing a problem encountered by the user; and
accessing the belief network and examining the probabilities to generate a resolution to the problem encountered by the user in response to receiving the input.

* * * * *